(12) United States Patent
Ly et al.

(10) Patent No.: US 11,528,711 B2
(45) Date of Patent: Dec. 13, 2022

(54) TECHNIQUES FOR TRANSPORT BLOCK TRANSMISSION OVER MULTIPLE SLOTS

(71) Applicant: QUALCOMM Incorporated, San Diego, CA (US)

(72) Inventors: Hung Dinh Ly, San Diego, CA (US); Gokul Sridharan, Sunnyvale, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 17/222,644

(22) Filed: Apr. 5, 2021

(65) Prior Publication Data

US 2022/0322356 A1 Oct. 6, 2022

(51) Int. Cl.
*H04W 72/02* (2009.01)
*H04W 72/04* (2009.01)
*H04W 8/24* (2009.01)

(52) U.S. Cl.
CPC ......... *H04W 72/0493* (2013.01); *H04W 8/24* (2013.01); *H04W 72/042* (2013.01); *H04W 72/0446* (2013.01); *H04W 72/0453* (2013.01)

(58) Field of Classification Search
CPC ........... H04W 72/0493; H04W 72/042; H04W 72/0453; H04W 72/0446; H04W 8/24; H04W 72/04; H04W 72/12; H04W 76/00; H04B 7/2121; H04B 7/2123
USPC ........................................................ 370/329
See application file for complete search history.

(56) References Cited

U.S. PATENT DOCUMENTS

| | | | | |
|---|---|---|---|---|
| 2020/0053778 | A1* | 2/2020 | Babaei | H04W 72/042 |
| 2020/0100170 | A1* | 3/2020 | Babaei | H04W 72/042 |
| 2020/0146059 | A1* | 5/2020 | Cirik | H04L 5/0007 |
| 2020/0280987 | A1* | 9/2020 | Liu | H04L 5/001 |
| 2021/0274483 | A1* | 9/2021 | Zhang | H04W 72/048 |
| 2021/0385836 | A1* | 12/2021 | Ye | H04W 16/14 |

(Continued)

OTHER PUBLICATIONS

Huawei., et al., "TB Mapping for Slot Aggregation", 3GPP Draft, 3GPP TSG RAN WG1 Meeting #89, R1-1706901,3rd Generation Partnership Project (3GPP), Mobile Competence Centre, 650, Route Des Lucioles, F-06921 Sophia-Antipolis Cedex, France, vol. RAN WG1, No. RAN WG1, No. Hangzhou, China, May 15, 2017-May 19, 2017, May 6, 2017 (May 6, 2017), 7 Pages, XP051261559, Retrieved from the Internet: URL: http://www.3gpp.org/ftp/tsg_ran/WG1_RL1/TSGR1_89/Docs/, [retrieved on May 6, 2017], Section 2, figure 1.

(Continued)

*Primary Examiner* — Robert J Lopata
(74) *Attorney, Agent, or Firm* — Holland & Hart LLP

(57) ABSTRACT

Methods, systems, and devices for wireless communications are described. A user equipment (UE) may receive, from a base station, a first downlink control information (DCI) message indicating the UE is to transmit a transport block over multiple available slots on at least a first carrier and a resource allocation for the transport block. The multiple available slots my span a time interval. The UE may receive, from the base station, a second DCI message indicating the UE is to switch from the first carrier to a second carrier during the interval. Based on the second DCI message, the UE may transmit at least a first portion of coded bits corresponding to the transport block on the first carrier in at least one available slot of the multiple available slots.

30 Claims, 20 Drawing Sheets

(56) References Cited

U.S. PATENT DOCUMENTS

| | | |
|---|---|---|
| 2022/0104298 A1* | 3/2022 | Ge .................... H04W 76/15 |
| 2022/0150036 A1* | 5/2022 | Ye .................... H04W 72/0453 |
| 2022/0217722 A1* | 7/2022 | Wang ................ H04W 72/08 |
| 2022/0224474 A1* | 7/2022 | Ly .................... H04L 25/0224 |

OTHER PUBLICATIONS

International Search Report and Written Opinion—PCT/US2022/021976—ISA/EPO—Jun. 10, 2022.

* cited by examiner

TECHNIQUES FOR TRANSPORT BLOCK TRANSMISSION OVER MULTIPLE SLOTS

FIELD OF TECHNOLOGY

The present disclosure relates to wireless communications, including techniques for transport block transmission over multiple slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support the transmission of transport blocks over multiple slots. For example, based on a size of a transport block, a UE may transmit the transport block over multiple uplink slots. Improved techniques for transmitting transport blocks over multiple slots may be desirable.

SUMMARY

The described techniques relate to improved methods, systems, devices, and apparatuses that support techniques for transport block transmission over multiple slots. Generally, the described techniques provide for managing carrier switching during transmission of a transport block over multiple slots. For example, a user equipment (UE) may be scheduled to transmit a transport block over multiple slots (e.g., uplink slots, special slots, flexible slots, or a combination thereof) on at least a first carrier such as a normal uplink (NUL) carrier. To schedule the transmission, a base station may transmit a first downlink control information (DCI) message to the UE that indicates the UE is to transmit the transport block over the multiple slots and indicates a resource allocation for the transport block, where the multiple slots span a time interval. The UE may receive, from the base station, a second DCI message that schedules the UE to switch from the first carrier to a second carrier (e.g., a supplementary uplink (SUL) carrier) during the time interval. The UE may then transmit at least a first portion of coded bits corresponding to the transport block on the first carrier in at least one slot of the multiple slots.

Based on a capability of the UE, the UE may manage switching carriers, transmitting a remaining portion of the transport block, or both. For example, the switch from the first carrier to the second carrier may be unsupported by the UE. Here, in some examples, the UE may refrain from switching carriers and may transmit a remaining portion of coded bits corresponding to the transport block on the first carrier in remaining slots of the multiple slots. In some other examples, here the UE may switch carriers and drop (e.g., not transmit) the remaining portion of coded bits corresponding to the transport block. Alternatively, the UE may support the switch from the first carrier to the second carrier. Here, in some cases, the UE may switch carriers, transmit, after a gap interval, one or more uplink messages on the second carrier in the time interval, switch back to the first carrier, and transmit a remaining portion of coded bits corresponding to the transport block on the first carrier. In some other cases, the UE may switch carriers and may transmit a second portion of coded bits corresponding to the transport block on the second carrier in the time interval.

A method for wireless communication at a user equipment (UE) is described. The method may include receiving a first downlink control information (DCI) message that indicates the UE is to transmit a single transport block over a set of multiple available slots on at least a first carrier and indicates a resource allocation for the transport block, the set of multiple available slots spanning a first time interval, receiving a second DCI message that indicates the UE is to switch from the first carrier to a second carrier in the first time interval, and transmitting, based on the second DCI message, at least a first portion of coded bits corresponding to the transport block on the first carrier in at least one available slot of the set of multiple available slots.

An apparatus for wireless communication at a UE is described. The apparatus may include a processor, memory coupled with the processor, and instructions stored in the memory. The instructions may be executable by the processor to cause the apparatus to receive a first DCI message that indicates the UE is to transmit a single transport block over a set of multiple available slots on at least a first carrier and indicates a resource allocation for the transport block, the set of multiple available slots spanning a first time interval, receive a second DCI message that indicates the UE is to switch from the first carrier to a second carrier in the first time interval, and transmit, based on the second DCI message, at least a first portion of coded bits corresponding to the transport block on the first carrier in at least one available slot of the set of multiple available slots.

Another apparatus for wireless communication at a UE is described. The apparatus may include means for receiving a first DCI message that indicates the UE is to transmit a single transport block over a set of multiple available slots on at least a first carrier and indicates a resource allocation for the transport block, the set of multiple available slots spanning a first time interval, means for receiving a second DCI message that indicates the UE is to switch from the first carrier to a second carrier in the first time interval, and means for transmitting, based on the second DCI message, at least a first portion of coded bits corresponding to the transport block on the first carrier in at least one available slot of the set of multiple available slots.

A non-transitory computer-readable medium storing code for wireless communication at a UE is described. The code may include instructions executable by a processor to receive a first DCI message that indicates the UE is to transmit a single transport block over a set of multiple available slots on at least a first carrier and indicates a resource allocation for the transport block, the set of multiple available slots spanning a first time interval, receive a second DCI message that indicates the UE is to switch from the first carrier to a second carrier in the first time interval, and transmit, based on the second DCI message, at least a first portion of coded bits corresponding to the transport block on the first carrier in at least one available slot of the set of multiple available slots.

Some examples of the method, apparatuses, and non-transitory computer-readable medium described herein may further include operations, features, means, or instructions for determining to refrain from switching, in response to the received second DCI message, from the first carrier to the second carrier in the first time interval based on a capability of the UE associated with carrier switching in the first time interval and transmitting a remaining portion of coded bits corresponding to the transport block on the first carrier in remaining slots of the set of multiple available slots based on the refraining.

Some examples of the method, apparatuses, and non-transitory computer-readable medium described herein may further include operations, features, means, or instructions for switching from the first carrier to the second carrier in the first time interval based on the second DCI message and dropping a remaining portion of coded bits corresponding to the transport block on the first carrier in remaining slots of the set of multiple available slots based on the switching and a capability of the UE associated with carrier switching in the first time interval.

Some examples of the method, apparatuses, and non-transitory computer-readable medium described herein may further include operations, features, means, or instructions for switching from the first carrier to the second carrier in the first time interval based on the second DCI message and transmitting, after switching from the first carrier to the second carrier in the first time interval, one or more uplink messages on the second carrier over one or more slots in the first time interval.

Some examples of the method, apparatuses, and non-transitory computer-readable medium described herein may further include operations, features, means, or instructions for switching from the second carrier to the first carrier in the first time interval after transmitting the one or more uplink messages on the second carrier based on a capability of the UE associated with carrier switching in the first time interval and transmitting, after switching from the second carrier to the first carrier in the first time interval, a second portion of coded bits corresponding to the transport block on the first carrier in one or more remaining slots of the set of multiple available slots.

In some examples of the method, apparatuses, and non-transitory computer-readable medium described herein, transmitting the one or more uplink messages on the second carrier may include operations, features, means, or instructions for transmitting the one or more uplink messages on the second carrier after a gap interval.

In some examples of the method, apparatuses, and non-transitory computer-readable medium described herein, a duration of the gap interval may be based on a first subcarrier spacing of the first carrier and a second subcarrier spacing of the second carrier.

In some examples of the method, apparatuses, and non-transitory computer-readable medium described herein, a duration of the gap interval corresponds to a fixed quantity of symbols of a slot.

Some examples of the method, apparatuses, and non-transitory computer-readable medium described herein may further include operations, features, means, or instructions for receiving control signaling that indicates a duration of the gap interval.

In some examples of the method, apparatuses, and non-transitory computer-readable medium described herein, the control signaling includes at least radio resource control (RRC) signaling, or system information (SI), or a combination thereof.

Some examples of the method, apparatuses, and non-transitory computer-readable medium described herein may further include operations, features, means, or instructions for transmitting a capability message indicating a supported time interval associated with carrier switching in the first time interval, where the gap interval corresponds to the supported time interval.

Some examples of the method, apparatuses, and non-transitory computer-readable medium described herein may further include operations, features, means, or instructions for transmitting a capability message indicating that the switch from the first carrier to the second carrier in the first time interval may be unsupported by the UE, where transmitting at least the first portion of coded bits corresponding to the transport block may be based on the switch from the first carrier to the second carrier in the first time interval being unsupported by the UE.

Some examples of the method, apparatuses, and non-transitory computer-readable medium described herein may further include operations, features, means, or instructions for transmitting a capability message indicating that the switch from the first carrier to the second carrier in the first time interval may be supported by the UE, where receiving the second DCI message may be based on the capability message.

Some examples of the method, apparatuses, and non-transitory computer-readable medium described herein may further include operations, features, means, or instructions for transmitting, based on the second DCI message, a second portion of coded bits corresponding to the transport block on the second carrier in the first time interval.

Some examples of the method, apparatuses, and non-transitory computer-readable medium described herein may further include operations, features, means, or instructions for transmitting the second portion of coded bits corresponding to the transport block on the second carrier may be based on a UE capability associated with carrier switching in the first time interval.

In some examples of the method, apparatuses, and non-transitory computer-readable medium described herein, transmitting the second portion of coded bits corresponding to the transport block on the second carrier may include operations, features, means, or instructions for transmitting the second portion of coded bits corresponding to the transport block on the second carrier after a gap interval associated with switching from the first carrier to the second carrier.

Some examples of the method, apparatuses, and non-transitory computer-readable medium described herein may further include operations, features, means, or instructions for transmitting a capability message indicating that the UE supports transmission of the transport block across multiple carriers, where transmitting the second portion of coded bits corresponding to the transport block on the second carrier in the first time interval may be in accordance with the capability message.

Some examples of the method, apparatuses, and non-transitory computer-readable medium described herein may further include operations, features, means, or instructions for transmitting at least a second portion of coded bits corresponding to the transport block on the first carrier in at least a second available slot of the set of multiple available slots based on an uplink transmission different from the transport block being scheduled in the first time interval, where the uplink transmission includes a sounding reference signal (SRS) transmission, a physical uplink control channel (PUCCH) transmission, a physical uplink shared channel (PUSCH) transmission, a physical random access channel (PRACH) transmission, a third portion of coded bits corresponding to the transport block, or a combination thereof.

Some examples of the method, apparatuses, and non-transitory computer-readable medium described herein may further include operations, features, means, or instructions for transmitting, based on switching between the first carrier and the second carrier in the first time interval, a second portion of coded bits corresponding to the transport block on the first carrier in one or more remaining slots of the set of multiple available slots such that a first phase associated with the first portion of coded bits corresponding to the transport block may be non-continuous with a second phase associated with the second portion of coded bits corresponding to the transport block.

In some examples of the method, apparatuses, and non-transitory computer-readable medium described herein, the set of multiple available slots include uplink slots, special slots, or a combination thereof.

Some examples of the method, apparatuses, and non-transitory computer-readable medium described herein may further include operations, features, means, or instructions for transmitting at least the first portion of coded bits corresponding to the transport block on the first carrier may be based on a UE capability associated with carrier switching in the first time interval, the UE capability associated with a frequency band or a combination of frequency bands.

In some examples of the method, apparatuses, and non-transitory computer-readable medium described herein, the second DCI message may be received at least a threshold period of time prior to transmitting the first portion of coded bits corresponding to the transport block.

In some examples of the method, apparatuses, and non-transitory computer-readable medium described herein, the first carrier may be a normal uplink (NUL) carrier and the second carrier may be a supplementary uplink (SUL) carrier.

A method for wireless communication at a base station is described. The method may include transmitting, to a UE a first DCI message that indicates the UE is to transmit a single transport block over a set of multiple available slots on at least a first carrier and indicates a resource allocation for the transport block, the set of multiple available slots spanning a first time interval, transmitting a second DCI message that indicates the UE is to switch from the first carrier to a second carrier in the first time interval, and receiving, based on the second DCI message, at least a first portion of coded bits corresponding to the transport block on the first carrier in at least one available slot of the set of multiple available slots.

An apparatus for wireless communication at a base station is described. The apparatus may include a processor, memory coupled with the processor, and instructions stored in the memory. The instructions may be executable by the processor to cause the apparatus to transmit, to a UE a first DCI message that indicates the UE is to transmit a single transport block over a set of multiple available slots on at least a first carrier and indicates a resource allocation for the transport block, the set of multiple available slots spanning a first time interval, transmit a second DCI message that indicates the UE is to switch from the first carrier to a second carrier in the first time interval, and receive, based on the second DCI message, at least a first portion of coded bits corresponding to the transport block on the first carrier in at least one available slot of the set of multiple available slots.

Another apparatus for wireless communication at a base station is described. The apparatus may include means for transmitting, to a UE a first DCI message that indicates the UE is to transmit a single transport block over a set of multiple available slots on at least a first carrier and indicates a resource allocation for the transport block, the set of multiple available slots spanning a first time interval, means for transmitting a second DCI message that indicates the UE is to switch from the first carrier to a second carrier in the first time interval, and means for receiving, based on the second DCI message, at least a first portion of coded bits corresponding to the transport block on the first carrier in at least one available slot of the set of multiple available slots.

A non-transitory computer-readable medium storing code for wireless communication at a base station is described. The code may include instructions executable by a processor to transmit, to a UE a first DCI message that indicates the UE is to transmit a single transport block over a set of multiple available slots on at least a first carrier and indicates a resource allocation for the transport block, the set of multiple available slots spanning a first time interval, transmit a second DCI message that indicates the UE is to switch from the first carrier to a second carrier in the first time interval, and receive, based on the second DCI message, at least a first portion of coded bits corresponding to the transport block on the first carrier in at least one available slot of the set of multiple available slots.

Some examples of the method, apparatuses, and non-transitory computer-readable medium described herein may further include operations, features, means, or instructions for receiving a remaining portion of coded bits corresponding to the transport block on the first carrier in remaining slots of the set of multiple available slots based on a capability of the UE associated with carrier switching in the first time interval.

Some examples of the method, apparatuses, and non-transitory computer-readable medium described herein may further include operations, features, means, or instructions for receiving one or more uplink messages on the second carrier in the first time interval based on the second DCI message and determining that the UE will drop a remaining portion of coded bits corresponding to the transport block on the first carrier in remaining slots of the set of multiple available slots based on a capability of the UE associated with carrier switching in the first time interval and based on the second DCI message.

Some examples of the method, apparatuses, and non-transitory computer-readable medium described herein may further include operations, features, means, or instructions for receiving, after a gap interval, one or more uplink messages on the second carrier over one or more slots in the first time interval based on the second DCI message.

Some examples of the method, apparatuses, and non-transitory computer-readable medium described herein may further include operations, features, means, or instructions for receiving, after a second gap interval, a second portion of coded bits corresponding to the transport block on the first carrier in one or more remaining slots of the set of multiple available slots based least in part on a capability of the UE associated with carrier switching in the first time interval.

Some examples of the method, apparatuses, and non-transitory computer-readable medium described herein may further include operations, features, means, or instructions for receiving, based on the second DCI message, a second portion of coded bits corresponding to the transport block on the second carrier in the first time interval.

Some examples of the method, apparatuses, and non-transitory computer-readable medium described herein may further include operations, features, means, or instructions for receiving a capability message indicating that the switch from the first carrier to the second carrier in the first time interval may be unsupported by the UE, where receiving at least the first portion of coded bits corresponding to the transport block may be based on the switch from the first carrier to the second carrier in the first time interval being unsupported by the UE.

Some examples of the method, apparatuses, and non-transitory computer-readable medium described herein may further include operations, features, means, or instructions for receiving a capability message indicating that the switch from the first carrier to the second carrier in the first time interval may be supported by the UE, where transmitting the second DCI message may be based on the capability message.

DETAILED DESCRIPTION

Figure 1:
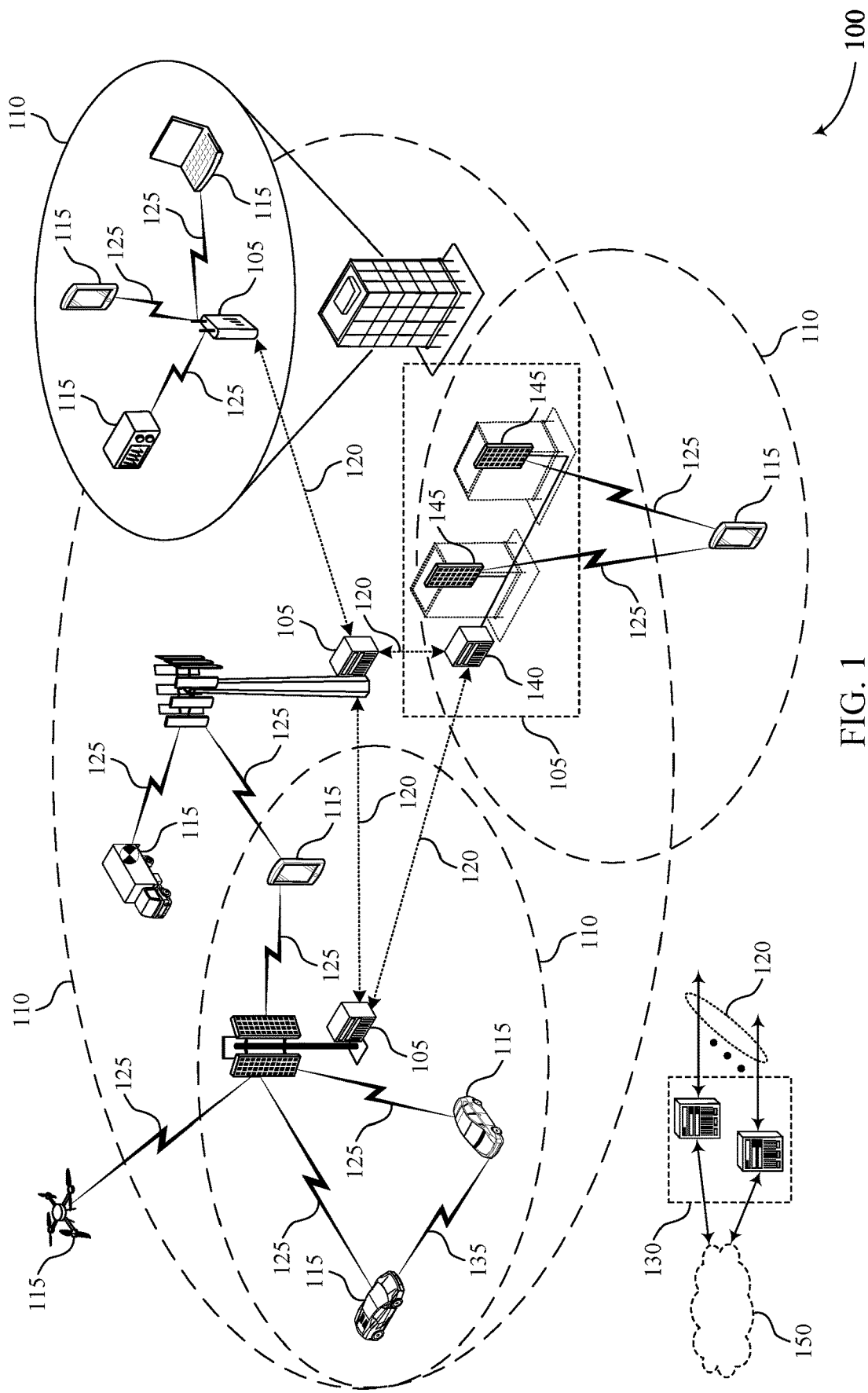
FIGS. 1 and 2 illustrate examples of wireless communications systems that support techniques for transport block transmission over multiple slots in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies (RATs). Examples of RATs include fourth generation (4G) systems, such as Long Term Evolution (LTE) systems, and fifth-generation (5G) systems, which may be referred to as new radio (NR) systems. In some examples, a UE may support transmitting a transmit block over multiple slots (e.g., uplink slots). For example, the UE may determine a transport block size based on a resource allocation across multiple slots and may transmit the transport block over multiple slots based on the size. Additionally, some wireless communications systems may support uplink carrier switching (e.g., between a normal uplink (NUL) carrier and a supplementary uplink (SUL) carrier, or between other uplink carriers) to improve uplink throughput, coverage, and reliability. Here, a base station may dynamically switch a UE between uplink carriers by transmitting a downlink control information (DCI) message that schedules the switch.

In some cases, however, the base station may schedule a carrier switch for the UE during transmission of a transport block over multiple slots. That is, in some cases, the base station may schedule the UE (e.g., via DCI) to transmit a transport block over multiple slots on a first carrier (e.g., an NUL carrier) and may schedule the UE to switch from the first carrier to a second carrier (e.g., an SUL carrier) at some time during a time interval spanned by the multiple slots to transmit uplink message(s) on the second carrier. This may cause the UE to stop the ongoing transmission of the transport block, switch to the second carrier to transmit the uplink message(s), and switch back to first carrier to finish transmitting the transport block on the first carrier. Such switching may increase a complexity associated with transmitting the transport block over the multiple slots. For example, to support such switching, the UE may increase a size of a buffer to track (e.g., store) information related to how much of the transport block had been transmitted at the time of the switching Additionally, the UE may increase a frequency of a checking loop to check a transmission state of the first and second carriers when switching between the carriers. In some cases, the increased complexity may result in a reduced reliability of the transport block transmission and/or the uplink message transmissions on the second carrier.

Techniques, systems, and devices are described herein to manage carrier switching during transmission of a transport block over multiple slots to reduce complexity and increase reliability associated with transmitting the transport block. For example, a UE may receive a first DCI message from a base station that schedules the UE to transmit a transport block over multiple available slots (e.g., uplink slots, special slots, flexible slots, or a combination thereof) on at least a first carrier (e.g., an NUL carrier) and indicates a resource allocation for the transport block. The multiple available slots may be continuous or one or more slots of the multiple available slots may be discontinuous in the time domain, and the multiple available slots may span a time interval from the first slot through the last slot. The UE may receive, from the base station, a second DCI message that schedules the UE to switch from the first carrier to a second carrier (e.g., an SUL carrier) during the time interval. The UE may then transmit at least a first portion of the transport block (e.g., a first portion of coded bits corresponding to the transport block) on the first carrier in at least one slot of the multiple available slots.

Based on a capability of the UE, the UE may manage the scheduled switch, a remaining portion of the transport block transmission (e.g., a remaining portion of coded bits corresponding to the transport block), or both. For example, the switch from the first carrier to the second carrier may be unsupported by the UE. In some examples of the switch being unsupported, the UE may refrain from switching carriers and may transmit the remaining portion of the transport block on the first carrier in remaining slots of the multiple available slots. In some other examples of the switch being unsupported, the UE may switch carriers and drop (e.g., refrain from transmitting) the remaining portion of the transport block. Alternatively, the ULE may support the switch from the first carrier to the second carrier. In some examples of the switch being supported, the UE may switch from the first carrier to the second carrier, transmit, after a gap interval, one or more uplink messages on the second carrier in the time interval, switch back to the first carrier, and transmit a remaining portion of the transport block on the first carrier in remaining slots of the multiple available slots. In some other examples of the switch being supported, the UE may switch carriers and may transmit at least a second portion of the transport block (e.g., a second portion of coded bits corresponding to the transport block) on the second carrier in the time interval.

Aspects of the subject matter described in this disclosure may be implemented to realize one or more of the following potential improvements, among others. The techniques employed by the UE and the base station may provide benefits and enhancements to the operation of the UE and the base station. In some examples, managing carrier switching during a transmission of a transport block over multiple slots may increase reliability and coverage of the transport block transmission and reduce a complexity of transmitting the transport block. In some other examples, managing carrier switching during a transmission of a transport block over multiple slots may provide improvements to latency, power consumption, resource usage, coordination between devices, battery life, and processing capability, among other benefits.

Aspects of the disclosure are initially described in the context of wireless communications systems. Aspects of the disclosure are additionally described in the context of transmission schemes. Aspects of the disclosure are further illustrated by and described with reference to apparatus diagrams, system diagrams, and flowcharts that relate to techniques for transport block transmission over multiple slots.

FIG. 1 illustrates an example of a wireless communications system 100 that supports techniques for transport block transmission over multiple slots in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an SI, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). In some cases, carriers configured in a TDD mode may include various slot patterns of uplink slots, downlink slots, and flexible slots (e.g., special slots) that may be either uplink slots or downlink slots. For example, a carrier configured in a TDD mode may be configured to include slots according to a DDDSU pattern, a DDDSUDDSUU pattern, a DDDDDDDSUU pattern, or a DDDUU pattern, among other patterns, where D is a downlink slot, S is a flexible slot, and U is an uplink slot. In some examples, carrier slot patterns may be associated with particular physical channels such as a physical uplink shared channel (PUSCH) for enhanced mobile broadband (eMBB), or a PUSCH for voice over internet protocol (VoIP), among other physical channels.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may support the transmission of transport blocks over one or more slots. For example, a UE 115 may determine a size of a transport block based on the resource allocation of a single slot of a carrier and may transmit the transport block in the single slot on the carrier. Alternatively, multiple slots (e.g., uplink slots, special slots, flexible slots, or a combination thereof) of a carrier may be available for transmission of a transport block. The UE 115 may determine a size of the transport block based on the multiple available slots and may transmit the transport block over two or more of the multiple available slots based on the determined size. In some examples, the multiple slots may be continuous slots in time. In some other examples, one or more of the multiple slots may be discontinuous with respect to other slots of the multiple slots in time. In some cases, the UE 115 may transmit a transport block over one or more slots via a PUSCH.

A UE 115 may transmit a transport block according to a redundancy version (RV). For example, the UE 115 may transmit the transport block according to an RV0, an RV1, an RV2, or an RV3, among other RVs. In some examples, the UE 115 may transmit multiple repetitions of a transport block over multiple transmission occasions. In some cases, the UE 115 may transmit each repetition of the transport block according to a different RV. For example, the UE 115 may transmit the transport block according to an RV0, a first repetition of the transport block according to an RV2, a second repetitions according to an RV3, and so on. In some examples, the UE 115 may encode a payload of a transport block that is transmitted over multiple slots according to a single RV.

The wireless communications system 100 may support carrier switching to improve throughput, coverage, and reliability. For example, a UE 115 and a base station 105 may communicate over an NUL carrier. The NUL carrier may be configured in an FDD mode or a TDD mode. In some examples, as a carrier frequency of the NUL carrier is increased, a coverage associated with the NUL carrier may decrease. In order to increase coverage, the base station 105 may configure the UE 115 with an SUL carrier. The SUL carrier may be configured in an FDD mode or a TDD mode. The UE 115 may be dynamically switched between the NUL carrier and the SUL carrier via DCI messages transmitted by the base station 105 indicating for the UE 115 to switch from the NUL carrier to the SUL carrier, or vice versa. In some examples, the NUL carrier may have a carrier frequency that is higher than the SUL carrier. In some cases, a numerology for the NUL carrier may be the same as or different from a numerology for the SUL carrier. In some examples, the NUL carrier and the SUL carrier may be configured for physical random access channel (PRACH) transmissions, sounding reference signal (SRS) transmissions, PUSCH transmissions, physical uplink control channel (PUCCH) transmissions, or a combination thereof, among other transmissions.

In some examples, a UE 115 may support inter-band carrier switching in an uplink carrier aggregation configuration. That is, the UE 115 may support carrier switching between carriers associated with different frequency bands. In some examples, simultaneous transmission on two inter-band carriers may be unsupported by the UE 115. In some other examples, simultaneous transmission on two inter-band carriers may be supported by the UE 115. In some cases, the UE 115 may indicate a capability of whether it supports simultaneous transmission on two inter-band carriers to a base station 105. The base station 105 may transmit a DCI message to the UE 115 to schedule the switch between inter-band carriers. In some examples, the base station 105 may indicate to the UE 115 (e.g., via the DCI message) whether to simultaneously transmit uplink messages on the two inter-band carriers (e.g., based on the capability of the UE 115). In some cases, a carrier associated with a first frequency band may have a different numerology (e.g., subcarrier spacing) from a carrier associated with a second frequency band.

Various aspects of the described techniques support managing carrier switching during transmission of a transport block over multiple slots to reduce complexity and increase reliability associated with transmitting the transport block. For example, a base station 105 may transmit a first DCI message that schedules a UE 115 to transmit a transport block over multiple slots spanning a time interval on a first carrier (e.g., an NUL carrier) and indicates a resource allocation for the transport block. The UE 115 may receive, from the base station 105, a second DCI message that schedules the UE 115 to switch from the first carrier to a second carrier (e.g., an SUL carrier) during the time interval. The UE 115 may transmit at least a first portion of the transport block on the first carrier in at least one slot of the multiple slots. The UE 115 may then manage the carrier switching and a remaining portion of the transport block transmission (e.g., refraining from switching carriers, dropping the remaining portion, transmitting on the second carrier after a gap interval, etc.) based on a capability of the UE 115.

Figure 2:
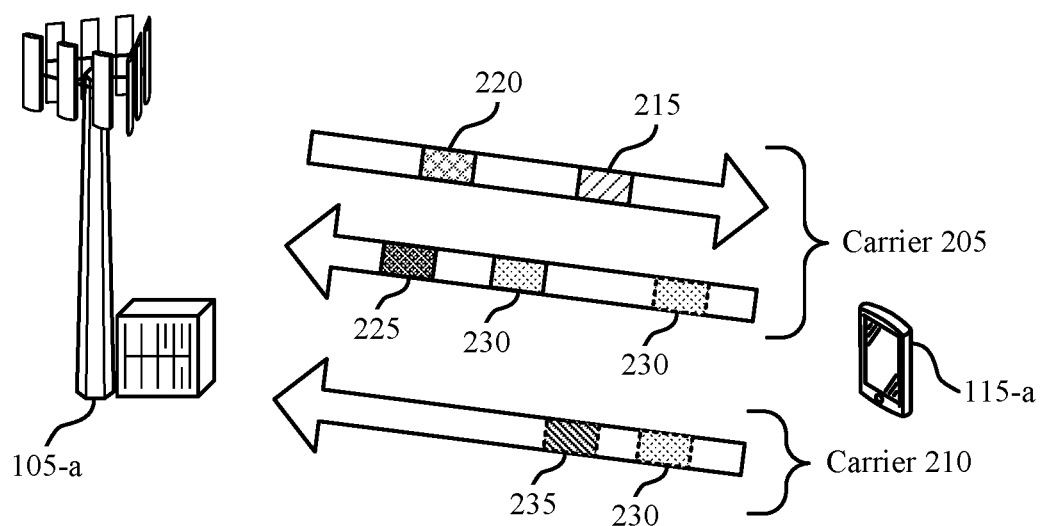
Figure 2:
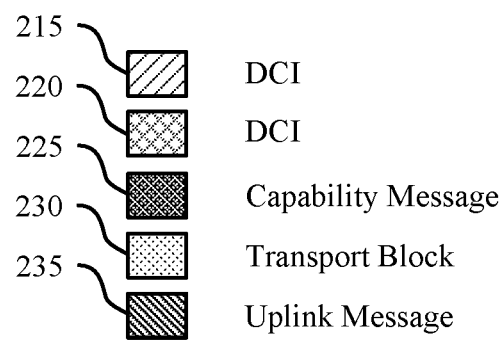

FIG. 2 illustrates an example of a wireless communications system 200 that supports techniques for transport block transmission over multiple slots in accordance with aspects of the present disclosure. The wireless communications system 200 may implement aspects of the wireless communications system 100 or may be implemented by aspects of the wireless communications system 100. For example, the wireless communications system 200 may include a base station 105-a and a UE 115-a, which may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. In some cases, the base station 105-a and the UE 115-a may support carrier switching management during transmission of a transport block 230 over multiple slots to provide improvements to transport block transmission complexity, reliability, coverage, latency, coordination between the base station 105-a and the UE 115-a, and resource usage, among other benefits.

The wireless communications system 200 may support communications between the base station 105-a and the UE 115-a. For example, the UE 115-a may communicate over a carrier 205 to communicate uplink transmissions and downlink transmission. In some examples, the carrier 205 may be an example of an NUL carrier. In some cases, if the carrier 205 is configured in an FDD mode, the carrier 205 may include a downlink carrier configured in the FDD mode over which the base station 105-a may transmit downlink messages and an uplink carrier configured in the FDD mode over which the UE 115-a may transmit uplink messages. In some examples, the carrier 205 may be associated with a physical uplink channel such as a PUCCH, a PUSCH, a PRACH, or some other physical uplink channel.

The base station 105-a and the UE 115-a may support carrier switching to improve throughput, coverage, and reliability. For example, the base station 105-a and the UE 115-a may support switching between the carrier 205 and a carrier 210 to communicate messages. In some examples, the carrier 210 may be an example of an SUL carrier. In some cases, the carrier 210 may be associated with a physical uplink channel such as a PUCCH, a PUSCH, a PRACH, or some other physical uplink channel.

The base station 105-a and the UE 115-a may support transmission of a transport block 230 over multiple slots of the carrier 205 (e.g., and the carrier 210). For example, the base station 105-a may transmit a DCI message 215 on the carrier 205 that indicates the UE 115-a to transmit the transport block 230 over multiple slots spanning a time interval on at least the carrier 205. The DCI message 215 may additionally indicate a resource allocation for the transport block 230 that includes, for example, time and frequency resources over which the UE 115-a may transmit the transport block 230. In some cases, the UE 115-a may be scheduled to switch from the carrier 205 to the carrier 210 during time interval in which the UE 115-a transmits the transport block 230. For example, at some time prior to or during transmission of the transport block 230, the base station 105-a may transmit a DCI message 220 on the carrier 205 that indicates for the UE 115-a to switch from the carrier 205 to the carrier 210 in the time interval (e.g., before the UE 115-a finishes transmitting the transport block 230). Accordingly, the UE 115-a may transmit a first portion of (e.g., coded bits corresponding to) the transport block 230 on the carrier 205 in at least one slot of the multiple slots. Then, the UE 115-a may perform various operations based on a capability of the UE 115-a associated with carrier switching during the time interval.

For example, the UE 115-a may not support carrier switching during transmission of the transport block 230 over the multiple slots. Alternatively, the UE 115-a may support carrier switching during transmission of the transport block 230 over the multiple slots. In either case, in some examples, the UE 115-a may transmit a capability message 225 (e.g., on the carrier 205) to indicate to the base station 105-a whether it supports the carrier switching. For example, the UE 115-a may transmit the capability message 225 to indicate that the switch from the carrier 205 to the carrier 210 in the time interval is unsupported by the UE 115-*a*. Alternatively, the UE 115-*a* may transmit the capability message 225 to indicate that the switch from the carrier 205 to the carrier 210 in the time interval is supported by the UE 115-*a*. In some examples, the UE 115-*a* may transmit the capability message 225 to indicate that the UE 115-*a* supports transmitting the transport block 230 across multiple carriers. For example, the capability message 225 may indicate that the UE 115-*a* may transmit a first portion of (e.g., coded bits corresponding to) the transport block 230 on the carrier 205 and a second portion of (e.g., coded bits corresponding to) the transport block 230 on the carrier 210. In some cases, the capability message may be associated with a frequency band or a combination of frequency bands.

If the UE 115-*a* does not support the carrier switching in the time interval, the UE 115-*a* may perform or may be configured to perform various operations in response to receiving the DCI message 220. In a first example, the UE 115-*a* may not apply the switch indicated by the DCI message 220. That is, the UE 115-*a* may determine to refrain from switching from the carrier 205 to the carrier 210 based on the carrier switching in the time interval being unsupported by the UE 115-*a*. Here, the UE 115-*a* may transmit a remaining portion of (e.g., coded bits corresponding to) the transport block 230 on the carrier 205 in remaining slots of the multiple slots. In a second example, the UE 115-*a* may apply the switch indicated by the DCI message 220 and may drop a remaining portion of the transport block 230. That is the UE 115-*a* may switch from the carrier 205 to the carrier 210 at the scheduled time in response to the DCI message 220 and may drop (e.g., refrain from transmitting) a remaining portion of the transport block 230 on the carrier 205 based on the carrier switching in the time interval being unsupported by the UE 115-*a*. In some examples, the DCI message 220 may schedule the transmission of one or more uplink messages on the carrier 210. Here, after switching from the carrier 205 to the carrier 210, the UE 115-*a* may transmit the one or more uplink messages on the carrier 210. In some examples, the one or more uplink messages may include one or more SRS transmissions, PUCCH transmissions, PUSCH transmissions, PRACH transmissions, or a combination thereof.

In some examples, the UE 115-*a* may not expect to be scheduled to switch from the carrier 205 to the carrier 210 in the time interval if the UE 115-*a* does not support the carrier switching in the time interval. For example, in response to receiving the capability message 225 that indicates that carrier switching is unsupported by the UE 115-*a*, the base station 105-*a* may refrain from transmitting the DCI message 220 that schedules the switch. As a result, the UE 115-*a* may transmit a remaining portion of the transport block 230 on the carrier 205 in remaining slots of the multiple slots without switching between the carrier 205 and the carrier 210.

If the UE 115-*a* supports the carrier switching in the time interval, the UE 115-*a* may perform or may be configured to perform other operations in response to receiving the DCI message 220. In a first example, the UE 115-*a* may apply the scheduled switch from the carrier 205 to the carrier 210 in response to the receiving the DCI message 220. Here, the DCI message 220 may schedule the transmission of one or more uplink messages on the carrier 210 (e.g., SRSs, PUCCH transmissions, PUSCH transmissions, PRACH transmissions, among other uplink messages). In some cases, the UE 115-*a* may transmit, after a gap interval, the one or more uplink messages on the carrier 210 in the time interval. For example, the UE 115-*a* may wait to transmit the one or more uplink messages on the carrier 210 until after the gap interval expires, for example, to provide additional time for the UE 115-*a* to tune to (e.g., adjust hardware of the UE 115-*a* to transmit on, check a transmission state of) the carrier 210. In some other cases, the UE 115-*a* may transmit the one or more uplink messages on the carrier 210 in the time interval without a gap interval. The UE 115-*a* may switch back to the carrier 205 based on the UE 115-*a* supporting the carrier switching in the time interval (e.g., after transmitting the one or more uplink messages). For example, because the UE 115-*a* supports the carrier switching in the time interval, the UE 115-*a* may switch from the carrier 210 to the carrier 205 in the time interval to transmit a remaining portion of the transport block 230 on the carrier 205 in remaining slots of the multiple slots. In some examples, the UE 115-*a* may start to transmit a remaining portion of the transport block 230 after a second gap interval expires.

In a second example, the UE 115-*a* may apply the scheduled switch from the carrier 205 to the carrier 210 in response to the receiving the DCI message 220. Here, the DCI message 215 or the DCI message 220 may indicate for the UE 115-*a* to transmit a second portion of (e.g., coded bits corresponding to) the transport block 230 on the carrier 210. Accordingly, the UE 115-*a* may transmit the second portion of the transport block 230 on the carrier 210 after switching from the carrier 205 to the carrier 210 in response to receiving the DCI message 220. In some examples, if the second portion of the transport block 230 does not include a remaining portion of the transport block 230, the UE 115-*a* may switch back to the carrier 205 to transmit the remaining portion of the transport block 230 in remaining slots of the multiple slots. In some cases, the UE 115-*a* may transmit the second portion of the transport block 230 on the carrier 210 in accordance with (e.g., based on) the capability message 225 indicating that the UE 115-*a* supports transmitting the transport block 230 across multiple carriers.

In some examples, the UE 115-*a* may not be expected to maintain phase continuity between portions of the transport block 230 if the UE 115-*a* switches between the carrier 205 and the carrier 210 in the time interval. For example, based on switching between the carrier 205 and the carrier 210 in the time interval, the UE 115-*a* may transmit a second portion of the transport block 230 on the carrier 205 such that a first phase associated with the first portion of the transport block 230 is non-continuous with a second phase associated with the second portion of the transport block 230. Additionally, or alternatively, the UE 115-*a* may be configured to perform joint channel estimation across transmitting different portions of the transport block 230. Here, the UE 115-*a* may not be expected to maintain phase continuity between the different portions of the transport block 230.

Figure 3:
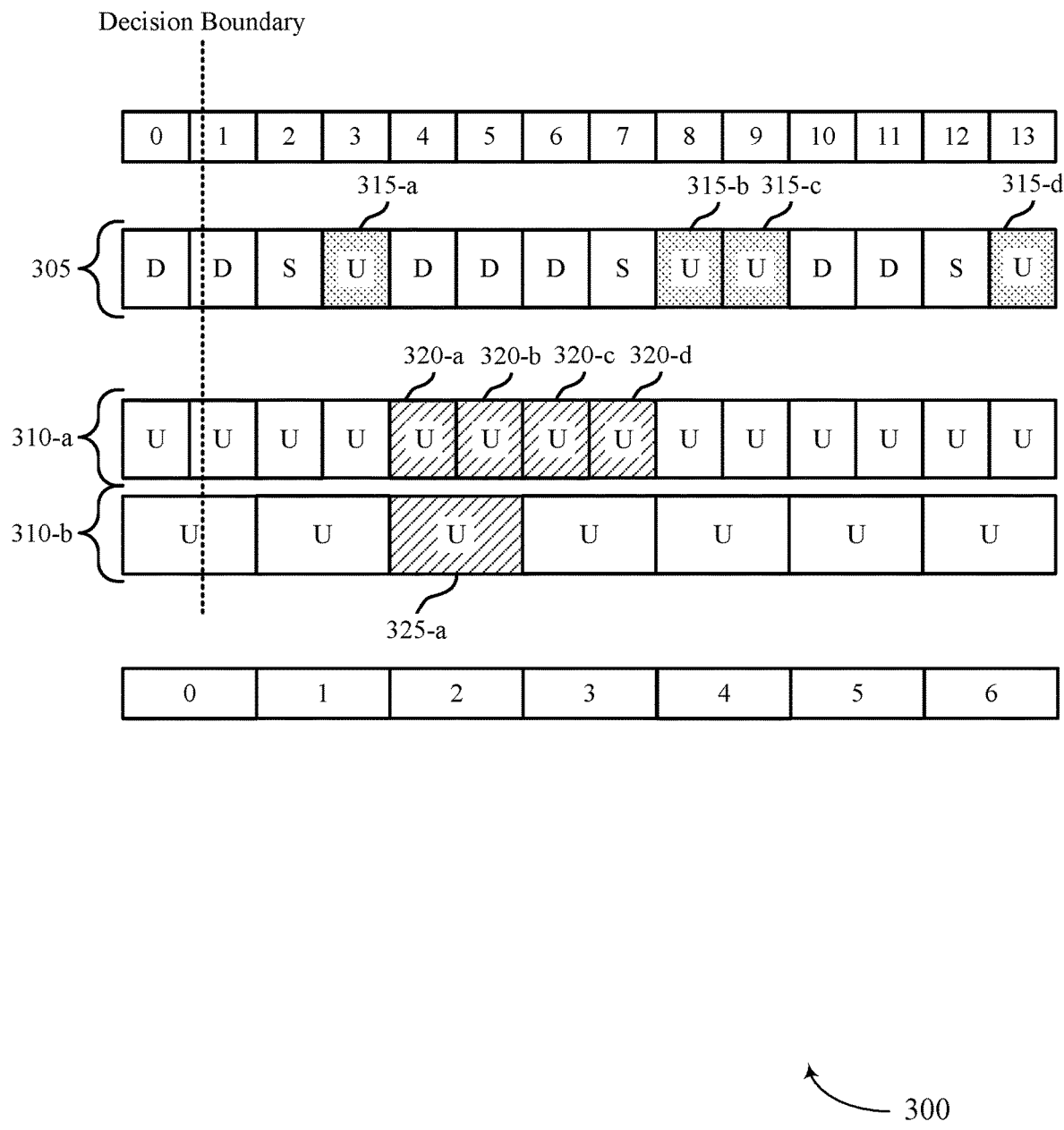
FIGS. 3 and 4 illustrate examples of transmission schemes that support techniques for transport block transmission over multiple slots in accordance with aspects of the present disclosure.

FIG. 3 illustrates an example of a transmission scheme 300 that supports techniques for transport block transmission over multiple slots in accordance with aspects of the present disclosure. The transmission scheme 300 may implement aspects of the wireless communications systems 100 and 200 or may be implemented by aspects of the wireless communications system 100 and 200 as described with reference to FIGS. 1 and 2, respectively. For example, the transmission scheme 300 may be implemented by a UE 115 and a base station 105 to support carrier switching management during a transmission of a transport block over multiple slots if the carrier switching is unsupported by the UE 115.

The transmission scheme 300 depicts a carrier 305, a carrier 310-a, and a carrier 310-b. The carrier 305, the carrier 310-a, and the carrier 310-b may include any quantity of slots in which the base station 105 and the UE 115 may communicate messages. For example, the carrier 305 and the carrier 310-a may include slots 0 through 13 and the carrier 310-b may include slots 0 through 6. In some cases, the carrier 310-a and the carrier 310-b may have different numerologies. For example, the carrier 310-a may have a first numerology associated with a first slot duration and the carrier 310-b may have a second numerology associated with a second slot duration. In some examples, the first numerology may be the same as a numerology for the carrier 305.

For illustrative purposes, the example of FIG. 3 depicts the carrier 305 being configured in a TDD mode (e.g., having downlink slots D, uplink slots U, and flexible slots S). In some examples, however, the carrier 305 may be configured in an FDD mode (e.g., having uplink slots U). Additionally, for illustrative purposes, the example of FIG. 3 depicts the carrier 310-a and the carrier 310-b being configured in an FDD mode (e.g., having uplink slots U). In some examples, however, the carrier 310-a and the carrier 310-b may be configured in a TDD mode (e.g., having downlink slots D, uplink slots U, and flexible slots S).

The UE 115 may be scheduled (e.g., via DCI) to transmit a transport block to the base station 105 over multiple uplink slots 315 of a carrier 305. For example, the UE 115 may be scheduled to transmit the transport block over an uplink slot 315-a, an uplink slot 315-b, an uplink slot 315-c, and an uplink slot 315-d of the carrier 305. Accordingly, the UE 115 may be scheduled to transmit the transmit the transport block in a time interval spanning from the uplink slot 315-a through the uplink slot 315-d.

Additionally, in some examples, the UE 115 may be scheduled (e.g., via DCI) to switch from the carrier 305 to the carrier 310-a or the carrier 310-b to transmit one or more uplink messages (e.g., SRS transmissions, PUCCH transmissions, PUSCH transmissions, PRACH transmissions, among other transmissions) on the carrier 310-a or the carrier 310-b. For example, the base station 105 may transmit a DCI message that schedules the UE 115 to transmit uplink messages on the carrier 310-a in an uplink slot 320-a, an uplink slot 320-b, an uplink slot 320-c, and an uplink slot 320-d. Alternatively, the base station 105 may transmit the DCI message to schedule the UE 115 to transmit uplink messages on the carrier 310-b in an uplink slot 325-a. The base station 105 may transmit the DCI message at least a threshold period of time prior to the uplink slot 315-a, the uplink slot 320-a, or the uplink slot 325-a. For example, the base station 105 may transmit the DCI message at least prior to a decision boundary located in slot 1. In some cases, the decision boundary may be configured such that if the base station 105 does not transmit the DCI message before the decision boundary, the UE 115 may assume that the base station 105 will not transmit the DCI message to schedule the switch.

In the example of FIG. 3, switching between the carrier 305 and the carrier 310-a or the carrier 310-b during the time interval may be unsupported by the UE 115. In a first example, the UE 115 may not expect to be scheduled to switch in the time interval based on the UE 115 not supporting the carrier switching during the time interval. Here, the base station 105 may refrain from transmitting the DCI message that schedules the switch between the carrier 305 and the carrier 310-a or the carrier 310-b. As a result, the UE 115-a may transmit the transport block over the uplink slots 315-a, 315-b, 315-c, and 315-d without switching between the carrier 305 and the carrier 310-a or the carrier 310-b.

In a second example, the UE 115 may receive the DCI message but may not switch from the carrier 305 to the carrier 310-a or the carrier 310-b. For example, the UE 115 may determine to refrain from switching from the carrier 305 to the carrier 310-a or the carrier 310-b based on the switching being unsupported by the UE 115. As a result of the refraining, the UE 115 transmit the transport block over the uplink slots 315-a, 315-b, 315-c, and 315-d without switching between the carrier 305 and the carrier 310-a or the carrier 310-b.

In a third example, the UE 115 may apply the switch indicated by the DCI message and may drop a remaining portion of the transport block. For example, the UE 115 may transmit a first portion of the transport block in the uplink slot 315-a. Then, the UE 115 may switch from the carrier 305 to the carrier 310-a or the carrier 310-b at the scheduled time in response to the DCI message. The UE 115 may transmit the uplink messages in the uplink slots 320-a, 320-b, 320-c, and 320-d on the carrier 310-a or the uplink messages in the uplink slot 325-a on the carrier 310-b after the switch. However, because the UE 115 does not support the switching, the UE 115 may drop (e.g., refrain from transmitting) a remaining portion of the transport block on the carrier 305 in the uplink slots 315-b, 315-c, and 315-d.

Figure 4:
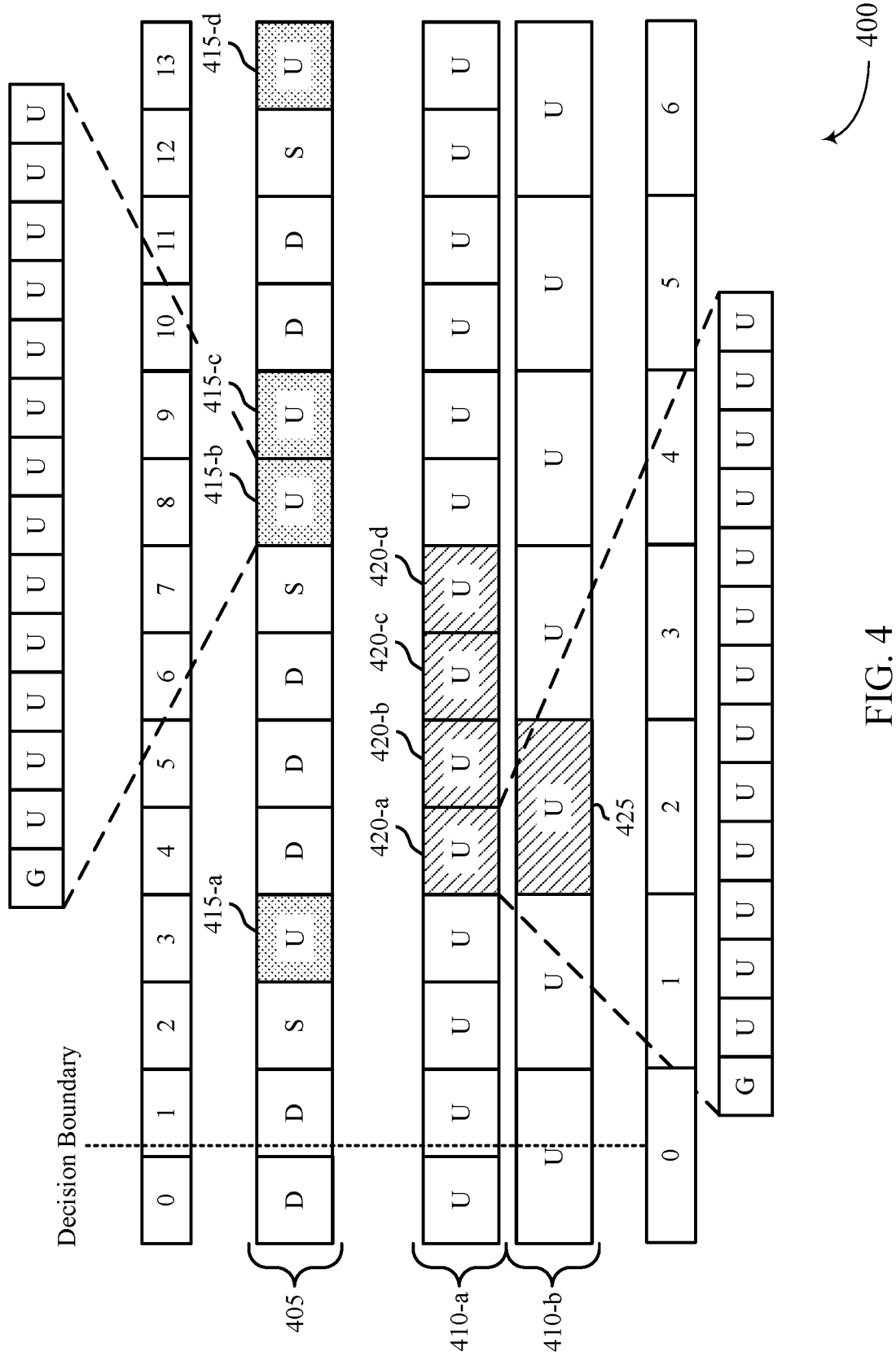

FIG. 4 illustrates an example of a transmission scheme 400 that supports techniques for transport block transmission over multiple slots in accordance with aspects of the present disclosure. The transmission scheme 400 may implement aspects of the wireless communications systems 100 and 200 or may be implemented by aspects of the wireless communications system 100 and 200 as described with reference to FIGS. 1 and 2, respectively. For example, the transmission scheme 400 may be implemented by a UE 115 and a base station 105 to support carrier switching management during a transmission of a transport block over multiple slots if the carrier switching is unsupported by the UE 115.

The transmission scheme 400 depicts a carrier 405, a carrier 410-a, and a carrier 410-b. The carrier 405, the carrier 410-a, and the carrier 410-b may include any quantity of slots in which the base station 105 and the UE 115 may communicate messages. For example, the carrier 405 and the carrier 410-a may include slots 0 through 13 and the carrier 410-b may include slots 0 through 6. In some cases, the carrier 410-a and the carrier 410-b may have different numerologies. For example, the carrier 410-a may have a first numerology associated with a first slot duration and the carrier 410-b may have a second numerology associated with a second slot duration. In some examples, the first numerology may be the same as a numerology for the carrier 405.

For illustrative purposes, the example of FIG. 4 depicts the carrier 405 being configured in a TDD mode (e.g., having downlink slots D, uplink slots U, and flexible slots S). In some examples, however, the carrier 405 may be configured in an FDD mode (e.g., having uplink slots U). Additionally, for illustrative purposes, the example of FIG. 4 depicts the carrier 410-a and the carrier 410-b being configured in an FDD mode (e.g., having uplink slots U). In some examples, however, the carrier 410-a and the carrier 410-b may be configured in a TDD mode (e.g., having downlink slots D, uplink slots U, and flexible slots S).

The UE 115 may be scheduled (e.g., via DCI) to transmit a transport block to the base station 105 over multiple uplink slots of a carrier 405. For example, the UE 115 may be scheduled to transmit the transport block over an uplink slot 415-*a*, an uplink slot 415-*b*, an uplink slot 415-*c*, and an uplink slot 415-*d* of the carrier 405. Accordingly, the UE 115 may be scheduled to transmit the transmit the transport block in a time interval spanning from the uplink slot 415-*a* through the uplink slot 415-*d*.

Additionally, in some examples, the UE 115 may be scheduled (e.g., via DCI) to switch from the carrier 405 to the carrier 410-*a* or the carrier 410-*b* in the time interval. For example, the base station 105 may transmit a DCI message that schedules the UE 115 to transmit uplink messages on the carrier 410-*a* in an uplink slot 420-*a*, an uplink slot 420-*b*, an uplink slot 420-*c*, and an uplink slot 420-*d*. Alternatively, the base station 105 may transmit the DCI message to schedule the UE 115 to transmit uplink messages on the carrier 410-*b* in an uplink slot 425-*a*. The base station 105 may transmit the DCI message at least a threshold period of time prior to the uplink slot 415-*a*, the uplink slot 420-*a*, or the uplink slot 425-*a*. For example, the base station 105 may transmit the DCI message at least prior to a decision boundary located in slot 1. In some cases, the decision boundary may be configured such that if the base station 105 does not transmit the DCI message before the decision boundary, the UE 115 may assume that the base station 105 will not transmit the DCI message to schedule the switch.

In the example of FIG. 4, the UE 115 may support switching between the carrier 405 and the carrier 410-*a* or the carrier 410-*b* during the time interval. In a first example, the UE 115 may apply the switch in response to receiving the DCI message. For example, the UE 115 may transmit a first portion of the transport block in the uplink slot 415-*a*. Then based on supporting the switching, the UE 115 may switch from the carrier 405 to the carrier 410-*a* or the carrier 410-*b* at the time scheduled by the DCI message.

The UE 115 the one or more uplink messages in the uplink slots 420-*a*, 420-*b*, 420-*c*, and 420-*d* on the carrier 410-*a* or in the uplink slot 425 after a gap interval. For example, the UE 115 may wait to transmit the one or more uplink messages until after the gap interval expires. In some examples, a duration of the gap interval may be based on one or both of a subcarrier spacing of the carrier 405 and a subcarrier spacing of the carrier 410-*a* or the carrier 410-*b*. For example, the duration of the gap interval may correspond to a symbol period associated with the carrier having the longer duration symbol period (e.g., 410-*b*). In some cases, the gap interval may correspond to a quantity of symbols of a slot. For example, each uplink slot 415, 420, or 425 may include a quantity of symbols U (e.g., 14 symbols, or some other quantity of symbols) in which the UE 115 may transmit the uplink messages, and one or more symbols of an uplink slot may be configured as a gap symbol G in which no uplink messages are transmitted. In some examples, the duration of the gap interval may correspond to a fixed quantity of symbols (e.g., one symbol, two symbols, three symbols, or some other fixed quantity of symbols). In some cases, the duration of the gap interval may correspond to some fraction a symbol duration (e.g., half of a symbol duration, one and half times a symbol duration, or some other fraction). In some cases, the base station 105 may transmit and the UE 115 may receive control signaling (e.g., RRC signaling, system information (SI), or a combination thereof) that indicates the duration of the gap interval. In some cases, the UE 115 may transmit a capability message that indicates a supported duration for the gap interval. Here the duration of the gap interval may correspond to the supported duration for the gap interval.

After transmitting the one or more uplink messages, the UE 115 may switch back to the carrier 405 based on the UE 115 supporting the switching. For example, because the UE 115 supports the switching in the time interval, the UE 115 switch from the carrier 410-*a* or the carrier 410-*b* to the carrier 405 in the time interval to transmit a second portion (e.g., a remaining portion) of the transport block on the carrier 405. In some examples, the UE 115 may start to transmit the second portion of the transport block after a second gap interval expires. For example, one or more symbols of the uplink slot 415-*b* may be configured as gap symbols G. In some cases, a duration of the second gap interval is the same as the duration of the gap interval. In some other cases, the duration of the second gap interval is different from the duration of the gap interval. In some examples, the UE 115 may be scheduled with multiple switches from the carrier 405 to the carrier 410-*a* or the carrier 410-*b* in the interval. For example, the UE 115 may receive a DCI message that schedules the UE 115 to switch to the carrier 410-*a* or the carrier 410-*b* after the uplink slot 415-*c*. Here, the UE 115 may apply the switch and another gap interval to transmit uplink messages on the carrier 410-*a* or the carrier 410-*a* and may switch back to the carrier 405 to transmit a remaining portion of the transport block on the carrier in uplink slot 415-*d* (e.g., after another gap interval).

In a second example, the UE 115 may apply the scheduled switch from the carrier 405 to the carrier 410-*a* or the carrier 410-*b* in response to the receiving the DCI message. Here, the DCI message may indicate for the UE 115 to transmit a second portion (e.g., a remaining portion) of the transport block on the carrier 410-*a* or the carrier 410-*b*. That is, the one or more uplink messages scheduled by the DCI message may include a second portion of the transport block. Accordingly, the UE 115 may transmit the second portion of the transport block on the carrier 410-*a* or the carrier 410-*b* after switching from the carrier 405. In some examples, the UE 115 may transmit the second portion of the transport block after a gap interval. In some cases, the second portion of the transport block may be a remaining portion of the transport block. Accordingly, the UE 115 may transport the remaining portion of the transport block on the carrier 410-*a* or the carrier 410-*b* without switching back to the carrier 405. In some other cases, the second portion of the transport block 230 may not be a remaining portion of the transport block. Here, the UE 115 may switch back to the carrier 405 to transmit the remaining portion of the transport block in one or more the uplink slot 415-*b*, 415-*c*, and 415-*d* (e.g., after a gap interval).

Figure 5:
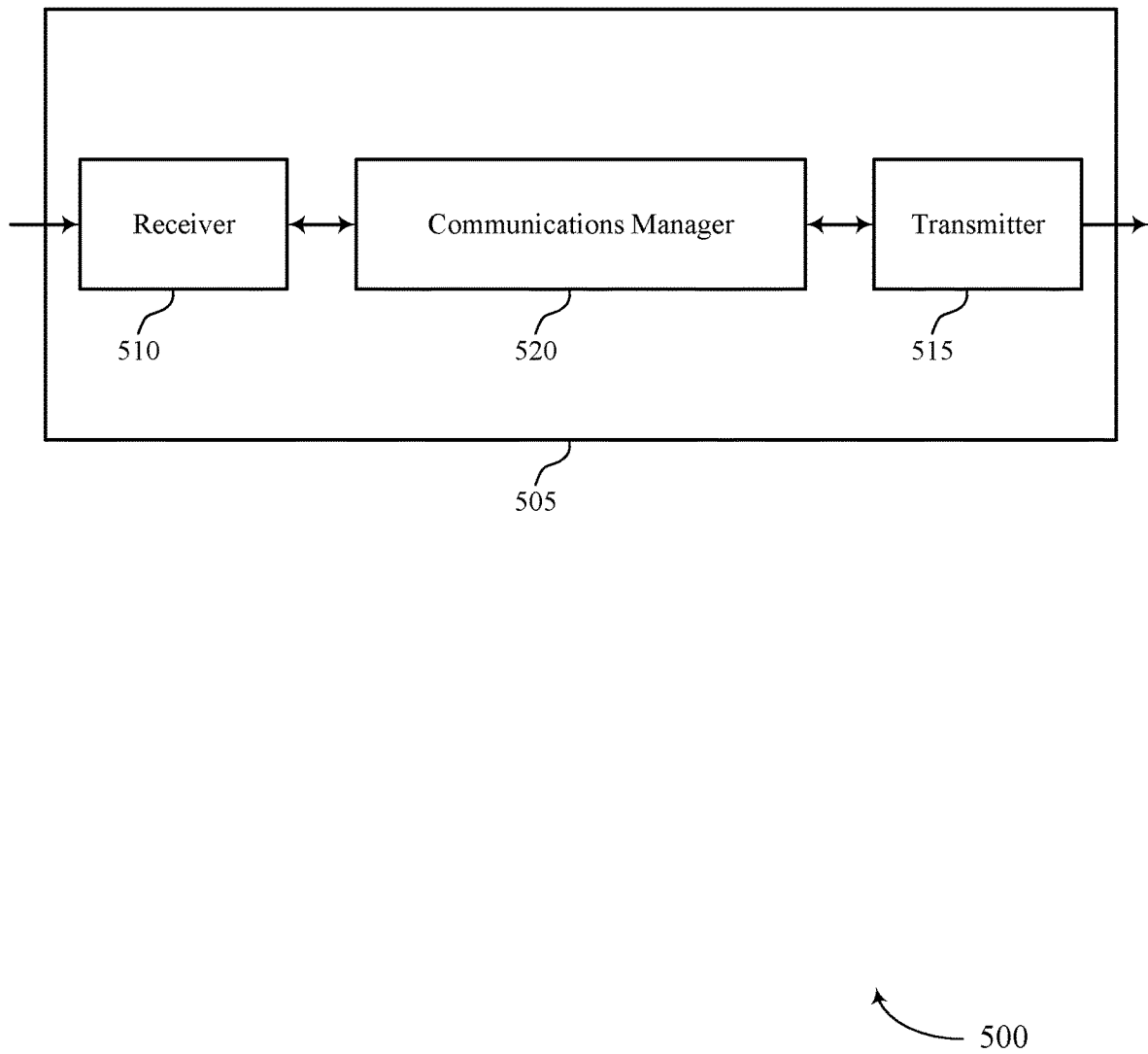
FIGS. 5 and 6 show block diagrams of devices that support techniques for transport block transmission over multiple slots in accordance with aspects of the present disclosure.

FIG. 5 shows a block diagram 500 of a device 505 that supports techniques for transport block transmission over multiple slots in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the transport block transmission features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for transport block transmission over multiple slots). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for transport block transmission over multiple slots). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for transport block transmission over multiple slots as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving a first DCI message that indicates the UE is to transmit a single transport block over a set of multiple available slots on at least a first carrier and indicates a resource allocation for the transport block, the set of multiple available slots spanning a first time interval. The communications manager 520 may be configured as or otherwise support a means for receiving a second DCI message that indicates the UE is to switch from the first carrier to a second carrier in the first time interval. The communications manager 520 may be configured as or otherwise support a means for transmitting, based on the second DCI message, at least a first portion of coded bits corresponding to the transport block on the first carrier in at least one available slot of the set of multiple available slots.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption, and reduced processing by supporting carrier switching management associated with transmission of a transport block over multiple slots.

Figure 6:
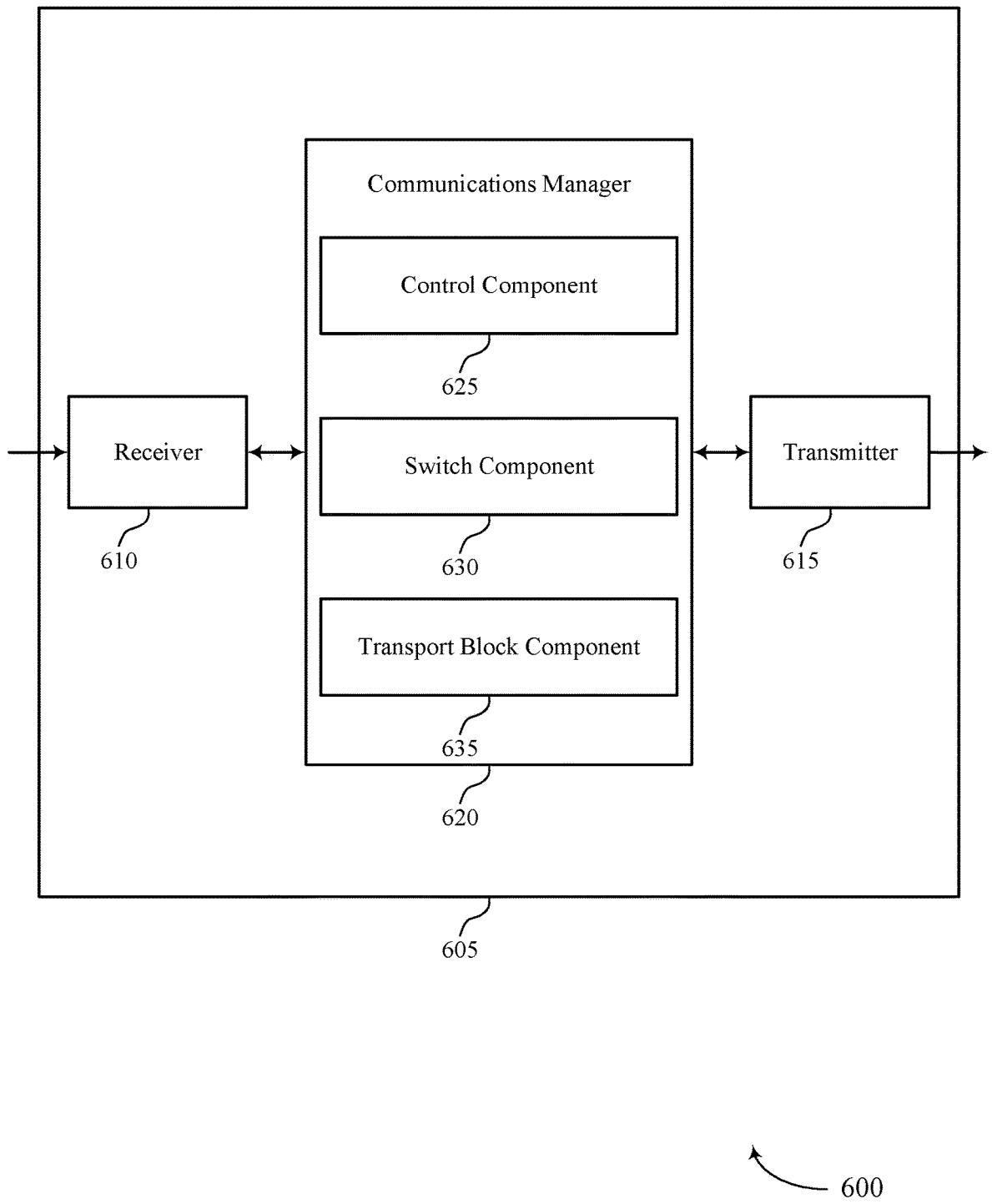

FIG. 6 shows a block diagram 600 of a device 605 that supports techniques for transport block transmission over multiple slots in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for transport block transmission over multiple slots). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for transport block transmission over multiple slots). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for transport block transmission over multiple slots as described herein. For example, the communications manager 620 may include a control component 625, a switch component 630, a transport block component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control component 625 may be configured as or otherwise support a means for receiving a first DCI message that indicates the UE is to transmit a single transport block over a set of multiple available slots on at least a first carrier and indicates a resource allocation for the transport block, the set of multiple available slots spanning a first time interval. The switch component 630 may be configured as or otherwise support a means for receiving a second DCI message that indicates the UE is to switch from the first carrier to a second carrier in the first time interval. The transport block component 635 may be configured as or otherwise support a means for transmitting, based on the second DCI message, at least a first portion of coded bits corresponding to the transport block on the first carrier in at least one available slot of the set of multiple available slots.

In some cases, the control component 625, the switch component 630, and the transport block component 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control component 625, the switch component 630, and the transport block component 635 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
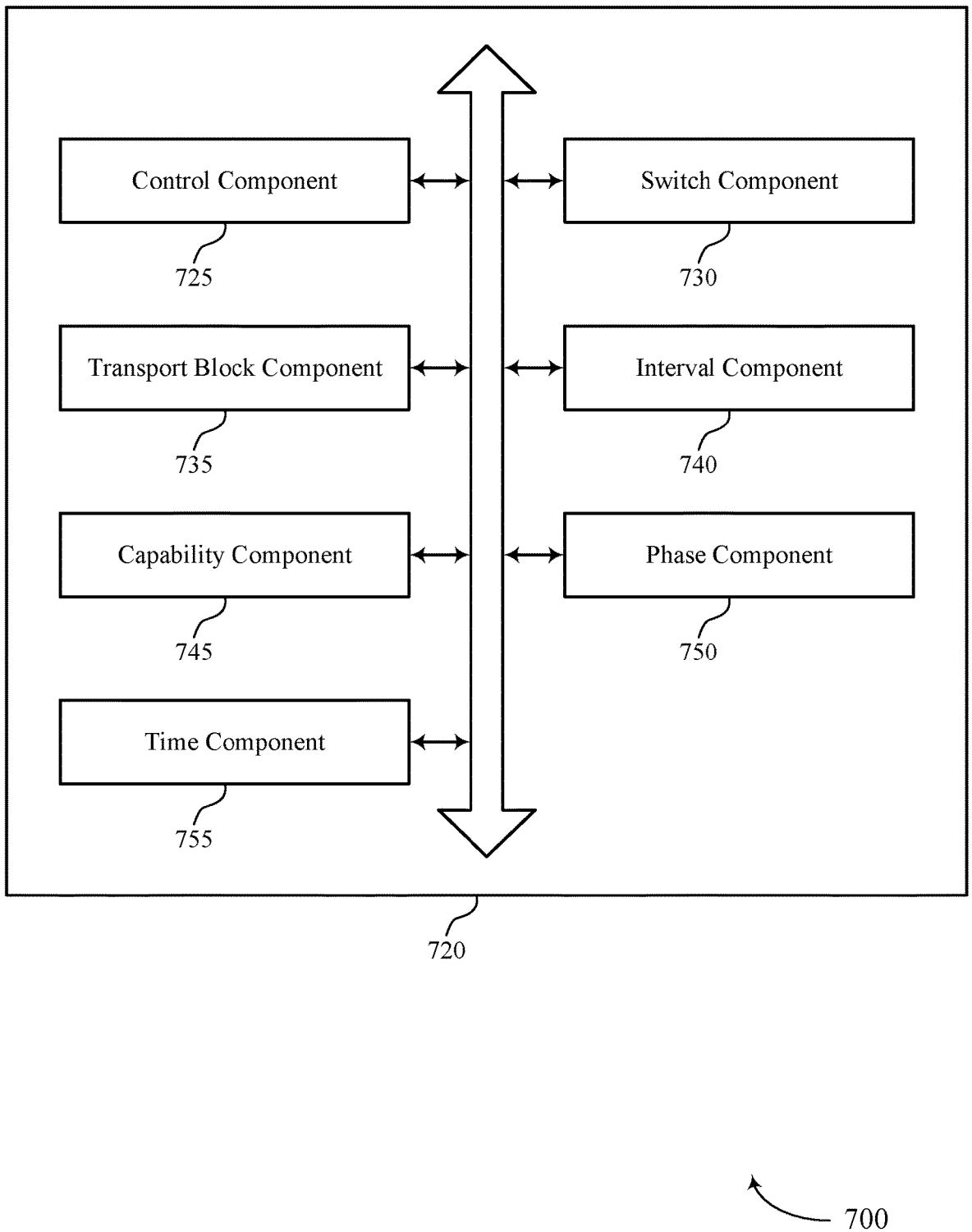
FIG. 7 shows a block diagram of a communications manager that supports techniques for transport block transmission over multiple slots in accordance with aspects of the present disclosure.

FIG. 7 shows a block diagram 700 of a communications manager 720 that supports techniques for transport block transmission over multiple slots in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for transport block transmission over multiple slots as described herein. For example, the communications manager 720 may include a control component 725, a switch component 730, a transport block component 735, an interval component 740, a capability component 745, a phase component 750, a time component 755, or any combination thereof. Each of these components may communicate, directly or indirectly, with one another (e.g., via one or more buses).

The communications manager 720 may support wireless communication at a UE in accordance with examples as disclosed herein. The control component 725 may be configured as or otherwise support a means for receiving a first DCI message that indicates the UE is to transmit a single transport block over a set of multiple available slots on at least a first carrier and indicates a resource allocation for the transport block, the set of multiple available slots spanning a first time interval. The switch component 730 may be configured as or otherwise support a means for receiving a second DCI message that indicates the UE is to switch from the first carrier to a second carrier in the first time interval. The transport block component 735 may be configured as or otherwise support a means for transmitting, based on the second DCI message, at least a first portion of coded bits corresponding to the transport block on the first carrier in at least one available slot of the set of multiple available slots.

In some examples, the switch component 730 may be configured as or otherwise support a means for determining to refrain from switching, in response to the received second DCI message, from the first carrier to the second carrier in the first time interval based on a capability of the UE associated with carrier switching in the first time interval. In some examples, the transport block component 735 may be configured as or otherwise support a means for transmitting a remaining portion of coded bits corresponding to the transport block on the first carrier in remaining slots of the set of multiple available slots based on the refraining.

In some examples, the switch component 730 may be configured as or otherwise support a means for switching from the first carrier to the second carrier in the first time interval based on the second DCI message. In some examples, the transport block component 735 may be configured as or otherwise support a means for dropping a remaining portion of coded bits corresponding to the transport block on the first carrier in remaining slots of the set of multiple available slots based on the switching and a capability of the UE associated with carrier switching in the first time interval.

In some examples, the switch component 730 may be configured as or otherwise support a means for switching from the first carrier to the second carrier in the first time interval based on the second DCI message. In some examples, the interval component 740 may be configured as or otherwise support a means for transmitting, after switching from the first carrier to the second carrier in the first time interval, one or more uplink messages on the second carrier over one or more slots in the first time interval.

In some examples, the switch component 730 may be configured as or otherwise support a means for switching from the second carrier to the first carrier in the first time interval after transmitting the one or more uplink messages on the second carrier based on a capability of the UE associated with carrier switching in the first time interval. In some examples, the transport block component 735 may be configured as or otherwise support a means for transmitting, after switching from the second carrier to the first carrier in the first time interval, a second portion of coded bits corresponding to the transport block on the first carrier in one or more remaining slots of the set of multiple available slots.

In some examples, to support transmitting the one or more uplink messages on the second carrier, the interval component 740 may be configured as or otherwise support a means for transmitting the one or more uplink messages on the second carrier after a gap interval.

In some examples, a duration of the gap interval is based on a first subcarrier spacing of the first carrier and a second subcarrier spacing of the second carrier.

In some examples, a duration of the gap interval corresponds to a fixed quantity of symbols of a slot.

In some examples, the interval component 740 may be configured as or otherwise support a means for receiving control signaling that indicates a duration of the gap interval.

In some examples, the control signaling includes at least RRC signaling, or SI, or a combination thereof.

In some examples, the time component 755 may be configured as or otherwise support a means for transmitting a capability message indicating a supported time interval associated with carrier switching in the first time interval, where the gap interval corresponds to the supported time interval.

In some examples, the capability component 745 may be configured as or otherwise support a means for transmitting a capability message indicating that the switch from the first carrier to the second carrier in the first time interval is unsupported by the UE, where transmitting at least the first portion of coded bits corresponding to the transport block is based on the switch from the first carrier to the second carrier in the first time interval being unsupported by the UE.

In some examples, the capability component 745 may be configured as or otherwise support a means for transmitting a capability message indicating that the switch from the first carrier to the second carrier in the first time interval is supported by the UE, where receiving the second DCI message is based on the capability message.

In some examples, the transport block component 735 may be configured as or otherwise support a means for transmitting, based on the second DCI message, a second portion of coded bits corresponding to the transport block on the second carrier in the first time interval.

In some examples, transmitting the second portion of coded bits corresponding to the transport block on the second carrier is based on a UE capability associated with carrier switching in the first time interval.

In some examples, to support transmitting the second portion of coded bits corresponding to the transport block on the second carrier, the transport block component 735 may be configured as or otherwise support a means for transmitting the second portion of coded bits corresponding to the transport block on the second carrier after a gap interval associated with switching from the first carrier to the second carrier.

In some examples, the capability component 745 may be configured as or otherwise support a means for transmitting a capability message indicating that the UE supports transmission of the transport block across multiple carriers, where transmitting the second portion of coded bits corresponding to the transport block on the second carrier in the first time interval is in accordance with the capability message.

In some examples, the transport block component 735 may be configured as or otherwise support a means for transmitting at least a second portion of coded bits corresponding to the transport block on the first carrier in at least a second available slot of the plurality of available slots based at least in part on an uplink transmission different from the transport block being scheduled in the first time interval.

In some examples, the uplink transmission comprises an SRS transmission, a PUCCH transmission, a PUSCH transmission, a PRACH transmission, a third portion of coded bits corresponding to the transport block, or a combination thereof.

In some examples, the phase component 750 may be configured as or otherwise support a means for transmitting, based on switching between the first carrier and the second carrier in the first time interval, a second portion of coded bits corresponding to the transport block on the first carrier in one or more remaining slots of the set of multiple available slots such that a first phase associated with the first portion of coded bits corresponding to the transport block is non-continuous with a second phase associated with the second portion of coded bits corresponding to the transport block.

In some examples, the set of multiple available slots includes uplink slots, special slots, or a combination thereof.

In some examples, transmitting at least the first portion of coded bits corresponding to the transport block on the first carrier is based at least in part on a UE capability associated with carrier switching in the first time interval, the UE capability associated with a frequency band or a combination of frequency bands.

In some examples, the second DCI message is received at least a threshold period of time prior to transmitting the first portion of coded bits corresponding to the transport block.

In some examples, the first carrier is an NUL carrier and the second carrier is an SUL carrier.

In some cases, the control component 725, the switch component 730, the transport block component 735, the interval component 740, the capability component 745, the phase component 750, and the time component 755 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control component 725, the switch component 730, the transport block component 735, the interval component 740, the capability component 745, the phase component 750, and the time component 755 discussed herein.

Figure 8:
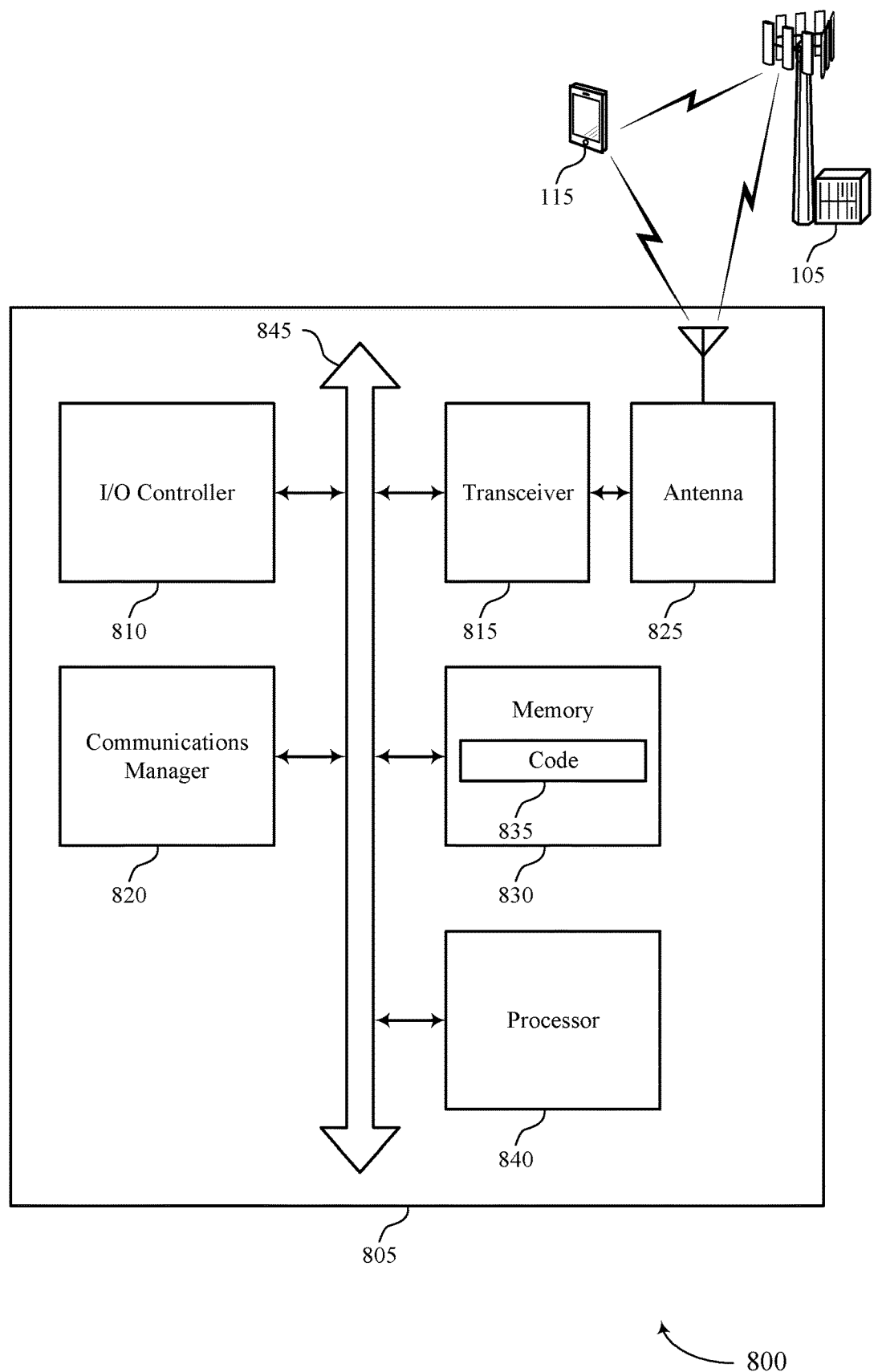
FIG. 8 shows a diagram of a system including a device that supports techniques for transport block transmission over multiple slots in accordance with aspects of the present disclosure.

FIG. 8 shows a diagram of a system 800 including a device 805 that supports techniques for transport block transmission over multiple slots in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for transport block transmission over multiple slots). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a first DCI message that indicates the UE is to transmit a single transport block over a set of multiple available slots on at least a first carrier and indicates a resource allocation for the transport block, the set of multiple available slots spanning a first time interval. The communications manager 820 may be configured as or otherwise support a means for receiving a second DCI message that indicates the UE is to switch from the first carrier to a second carrier in the first time interval. The communications manager 820 may be configured as or otherwise support a means for transmitting, based on the second DCI message, at least a first portion of coded bits corresponding to the transport block on the first carrier in at least one available slot of the set of multiple available slots.

By including or configuring the communications manager 820 in accordance with examples as described herein, the device 805 may support techniques for improved transport block transmission complexity, reliability, coverage, latency, power consumption, resource usage, coordination between devices, battery life, and processing capability, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for transport block transmission over multiple slots as described herein, or the processor 840 and the memory 830 may be otherwise configured to perform or support such operations.

Figure 9:
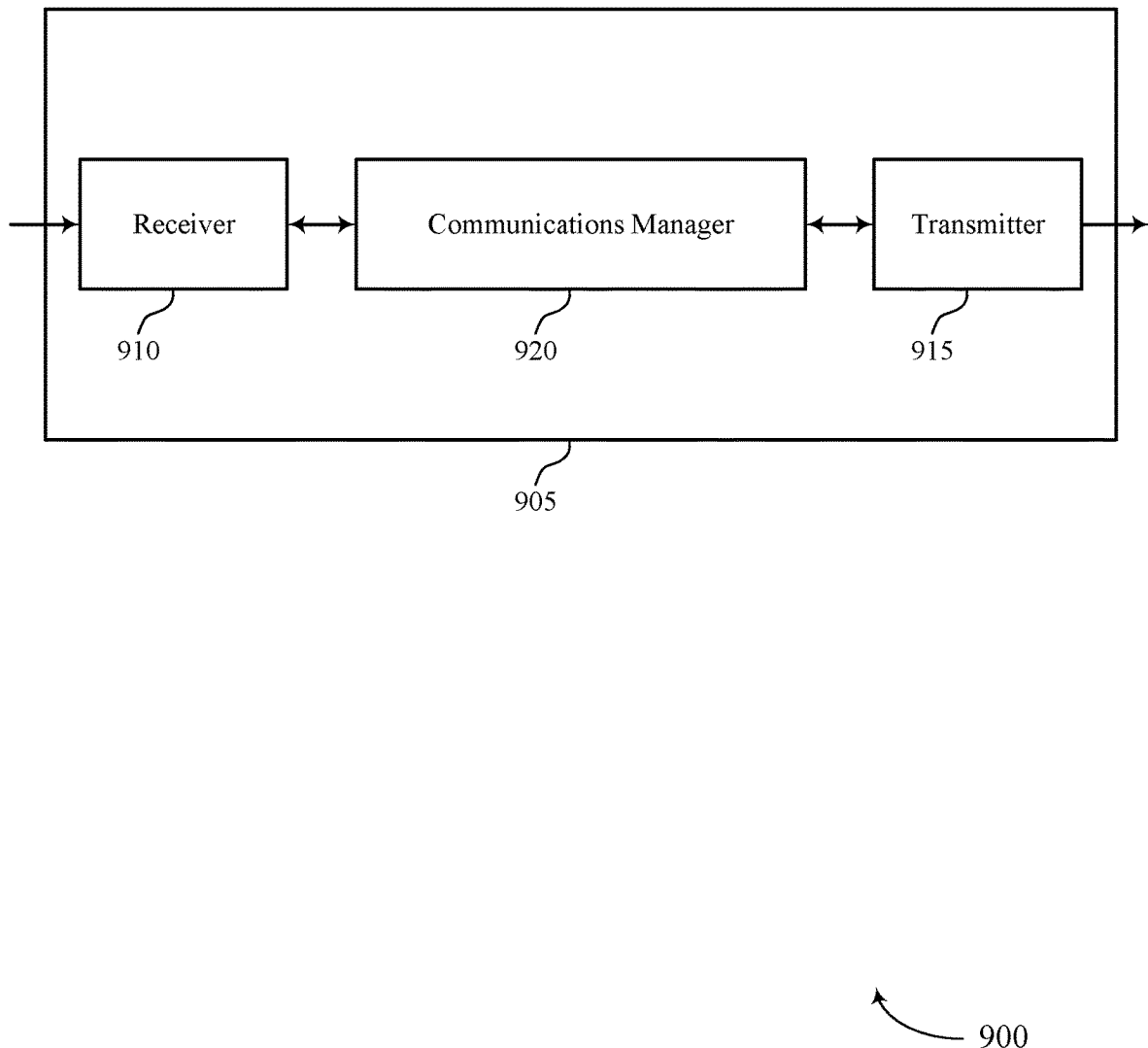
FIGS. 9 and 10 show block diagrams of devices that support techniques for transport block transmission over multiple slots in accordance with aspects of the present disclosure.

FIG. 9 shows a block diagram 900 of a device 905 that supports techniques for transport block transmission over multiple slots in accordance with aspects of the present disclosure. The device 905 may be an example of aspects of a base station 105 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform the transport block transmission features discussed herein. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for transport block transmission over multiple slots). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for transport block transmission over multiple slots). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for transport block transmission over multiple slots as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE a first DCI message that indicates the UE is to transmit a single transport block over a set of multiple available slots on at least a first carrier and indicates a resource allocation for the transport block, the set of multiple available slots spanning a first time interval. The communications manager 920 may be configured as or otherwise support a means for transmitting a second DCI message that indicates the UE is to switch from the first carrier to a second carrier in the first time interval. The communications manager 920 may be configured as or otherwise support a means for receiving, based on the second DCI message, at least a first portion of coded bits corresponding to the transport block on the first carrier in at least one available slot of the set of multiple available slots.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption, and reduced processing by supporting carrier switching management associated with transmission of a transport block over multiple slots.

Figure 10:
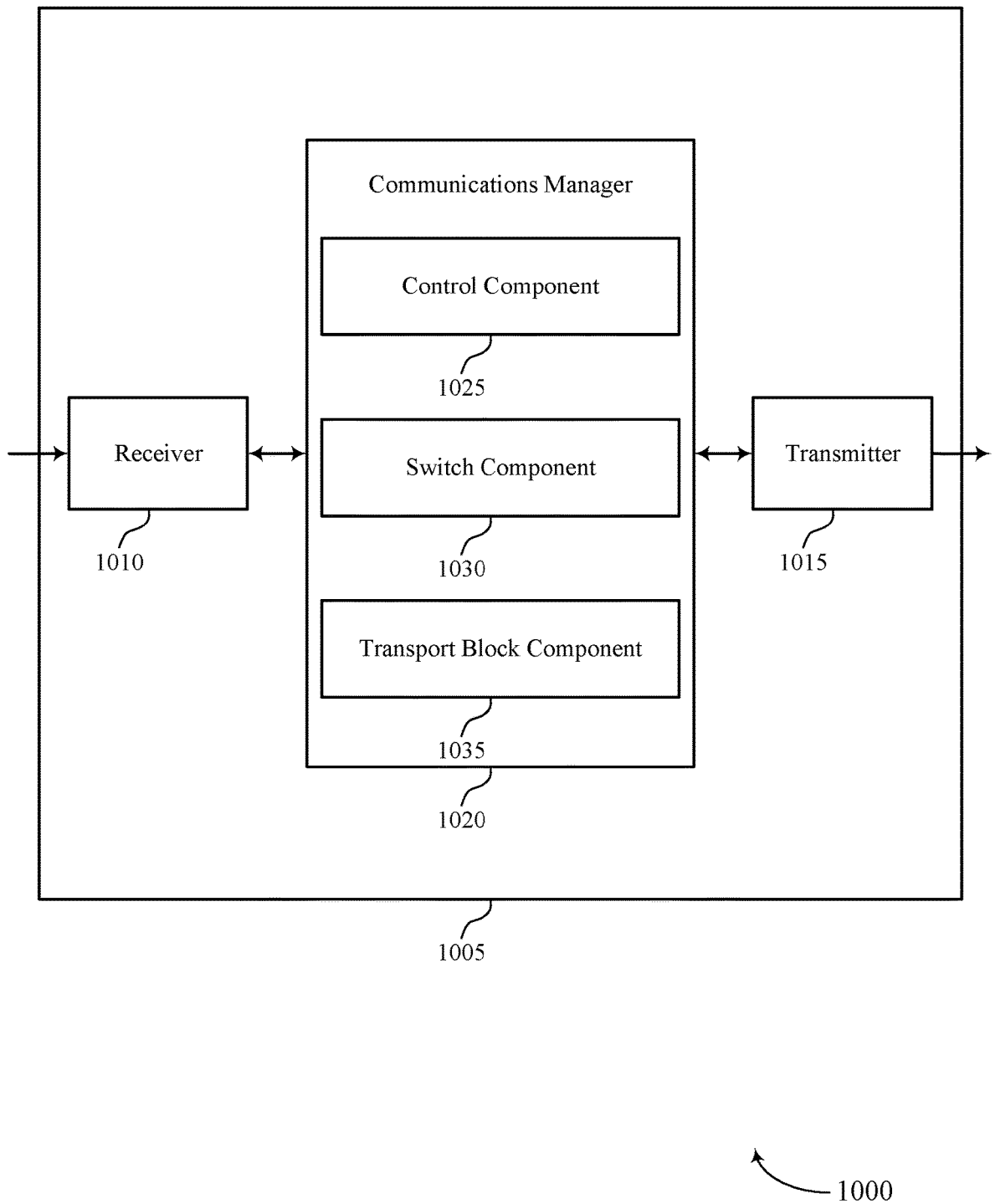

FIG. 10 shows a block diagram 1000 of a device 1005 that supports techniques for transport block transmission over multiple slots in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for transport block transmission over multiple slots). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for transport block transmission over multiple slots). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for transport block transmission over multiple slots as described herein. For example, the communications manager 1020 may include a control component 1025, a switch component 1030, a transport block component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The control component 1025 may be configured as or otherwise support a means for transmitting, to a UE a first DCI message that indicates the UE is to transmit a single transport block over a set of multiple available slots on at least a first carrier and indicates a resource allocation for the transport block, the set of multiple available slots spanning a first time interval. The switch component 1030 may be configured as or otherwise support a means for transmitting a second DCI message that indicates the UE is to switch from the first carrier to a second carrier in the first time interval. The transport block component 1035 may be configured as or otherwise support a means for receiving, based on the second DCI message, at least a first portion of coded bits corresponding to the transport block on the first carrier in at least one available slot of the set of multiple available slots.

In some cases, the control component 1025, the switch component 1030, and the transport block component 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control component 1025, the switch component 1030, and the transport block component 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
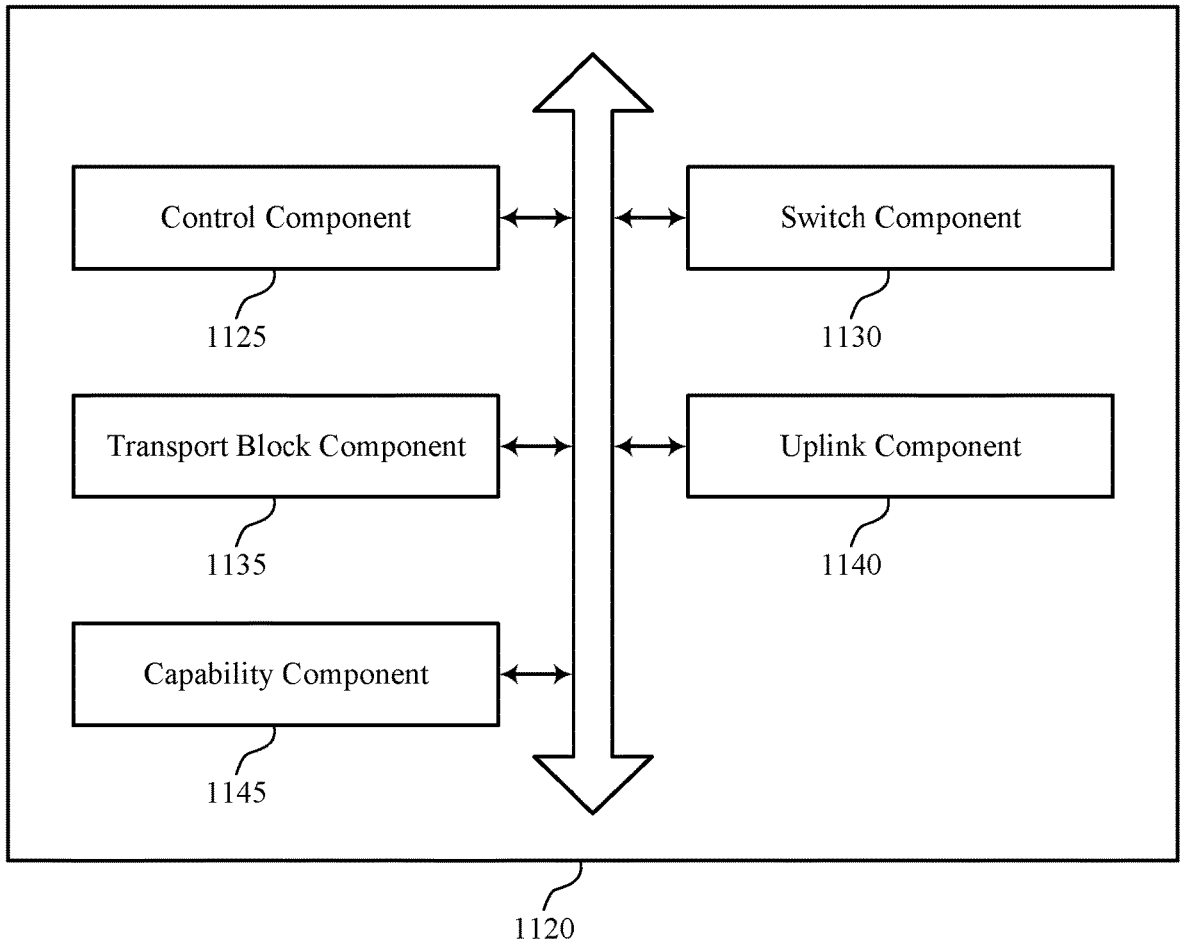
FIG. 11 shows a block diagram of a communications manager that supports techniques for transport block transmission over multiple slots in accordance with aspects of the present disclosure.

FIG. 11 shows a block diagram 1100 of a communications manager 1120 that supports techniques for transport block transmission over multiple slots in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for transport block transmission over multiple slots as described herein. For example, the communications manager 1120 may include a control component 1125, a switch component 1130, a transport block component 1135, an uplink component 1140, a capability component 1145, or any combination thereof. Each of these components may communicate, directly or indirectly, with one another (e.g., via one or more buses).

The communications manager 1120 may support wireless communication at a base station in accordance with examples as disclosed herein. The control component 1125 may be configured as or otherwise support a means for transmitting, to a UE a first DCI message that indicates the UE is to transmit a single transport block over a set of multiple available slots on at least a first carrier and indicates a resource allocation for the transport block, the set of multiple available slots spanning a first time interval. The switch component 1130 may be configured as or otherwise support a means for transmitting a second DCI message that indicates the UE is to switch from the first carrier to a second carrier in the first time interval. The transport block component 1135 may be configured as or otherwise support a means for receiving, based on the second DCI message, at least a first portion of coded bits corresponding to the transport block on the first carrier in at least one available slot of the set of multiple available slots.

In some examples, the transport block component 1135 may be configured as or otherwise support a means for receiving a remaining portion of coded bits corresponding to the transport block on the first carrier in remaining slots of the set of multiple available slots based on a capability of the UE associated with carrier switching in the first time interval.

In some examples, the uplink component 1140 may be configured as or otherwise support a means for receiving one or more uplink messages on the second carrier in the first time interval based on the second DCI message. In some examples, the capability component 1145 may be configured as or otherwise support a means for determining that the UE will drop a remaining portion of coded bits corresponding to the transport block on the first carrier in remaining slots of the set of multiple available slots based on a capability of the UE associated with carrier switching in the first time interval and based on the second DCI message.

In some examples, the uplink component 1140 may be configured as or otherwise support a means for receiving, after a gap interval, one or more uplink messages on the second carrier over one or more slots in the first time interval based on the second DCI message.

In some examples, the transport block component 1135 may be configured as or otherwise support a means for receiving, after a second gap interval, a second portion of coded bits corresponding to the transport block on the first carrier in one or more remaining slots of the set of multiple available slots based least in part on a capability of the UE associated with carrier switching in the first time interval.

In some examples, the capability component 1145 may be configured as or otherwise support a means for receiving a capability message indicating that the switch from the first carrier to the second carrier in the first time interval is unsupported by the UE, where receiving at least the first portion of coded bits corresponding to the transport block is based on the switch from the first carrier to the second carrier in the first time interval being unsupported by the UE.

In some examples, the capability component 1145 may be configured as or otherwise support a means for receiving a capability message indicating that the switch from the first carrier to the second carrier in the first time interval is supported by the UE, where transmitting the second DCI message is based on the capability message.

In some examples, the transport block component 1135 may be configured as or otherwise support a means for receiving, based on the second DCI message, a second portion of coded bits corresponding to the transport block on the second carrier in the first time interval.

In some cases, the control component 1125, the switch component 1130, the transport block component 1135, the uplink component 1140, and the capability component 1145 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control component 1125, the switch component 1130, the transport block component 1135, the uplink component 1140, and the capability component 1145 discussed herein.

Figure 12:
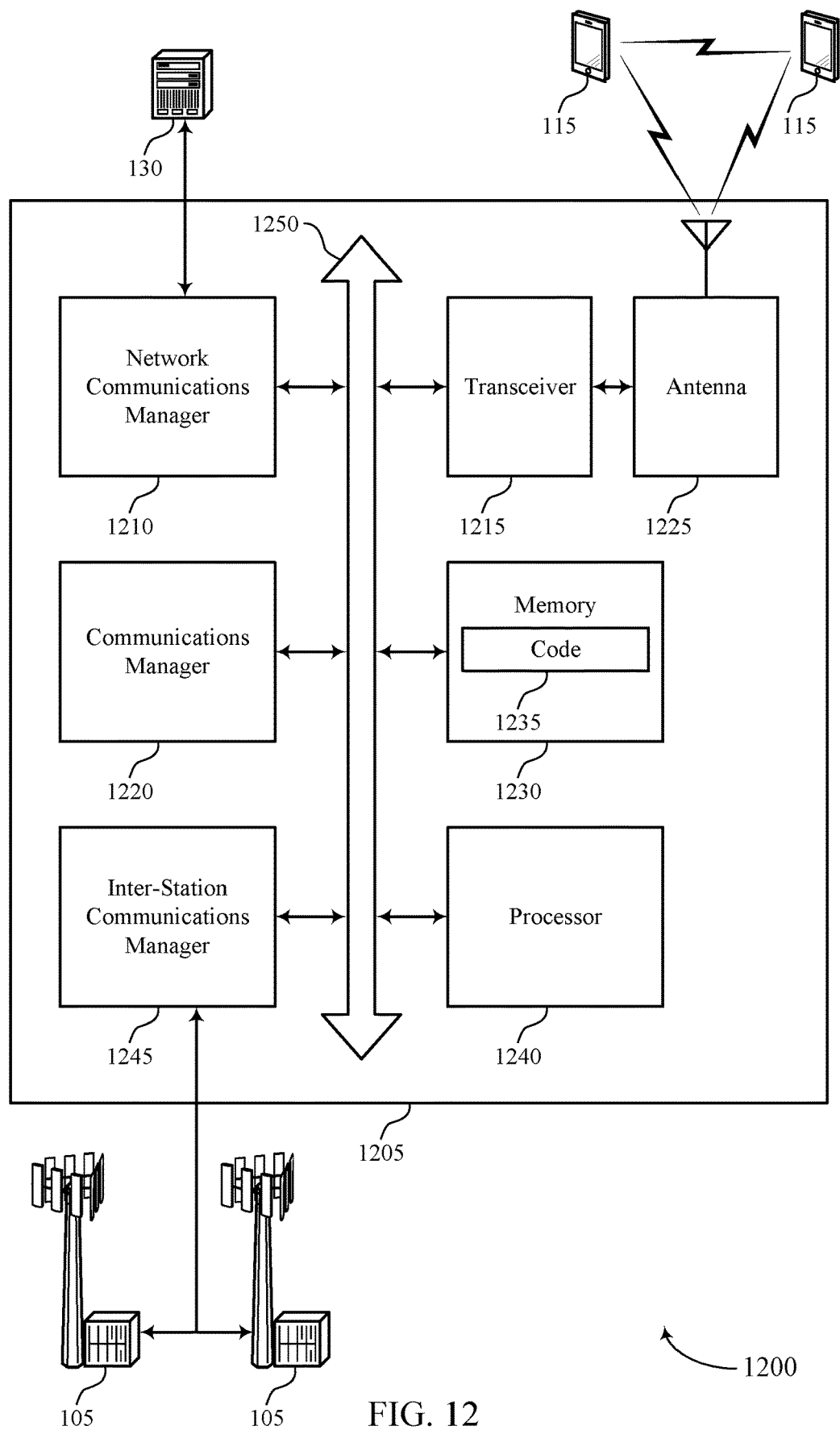
FIG. 12 shows a diagram of a system including a device that supports techniques for transport block transmission over multiple slots in accordance with aspects of the present disclosure.

FIG. 12 shows a diagram of a system 1200 including a device 1205 that supports techniques for transport block transmission over multiple slots in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for transport block transmission over multiple slots). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE a first DCI message that indicates the UE is to transmit a single transport block over a set of multiple available slots on at least a first carrier and indicates a resource allocation for the transport block, the set of multiple available slots spanning a first time interval. The communications manager 1220 may be configured as or otherwise support a means for transmitting a second DCI message that indicates the UE is to switch from the first carrier to a second carrier in the first time interval. The communications manager 1220 may be configured as or otherwise support a means for receiving, based on the second DCI message, at least a first portion of coded bits corresponding to the transport block on the first carrier in at least one available slot of the set of multiple available slots.

By including or configuring the communications manager 1220 in accordance with examples as described herein, the device 1205 may support techniques for improved transport block transmission complexity, reliability, coverage, latency, power consumption, resource usage, coordination between devices, battery life, and processing capability, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for transport block transmission over multiple slots as described herein, or the processor 1240 and the memory 1230 may be otherwise configured to perform or support such operations.

Figure 13:
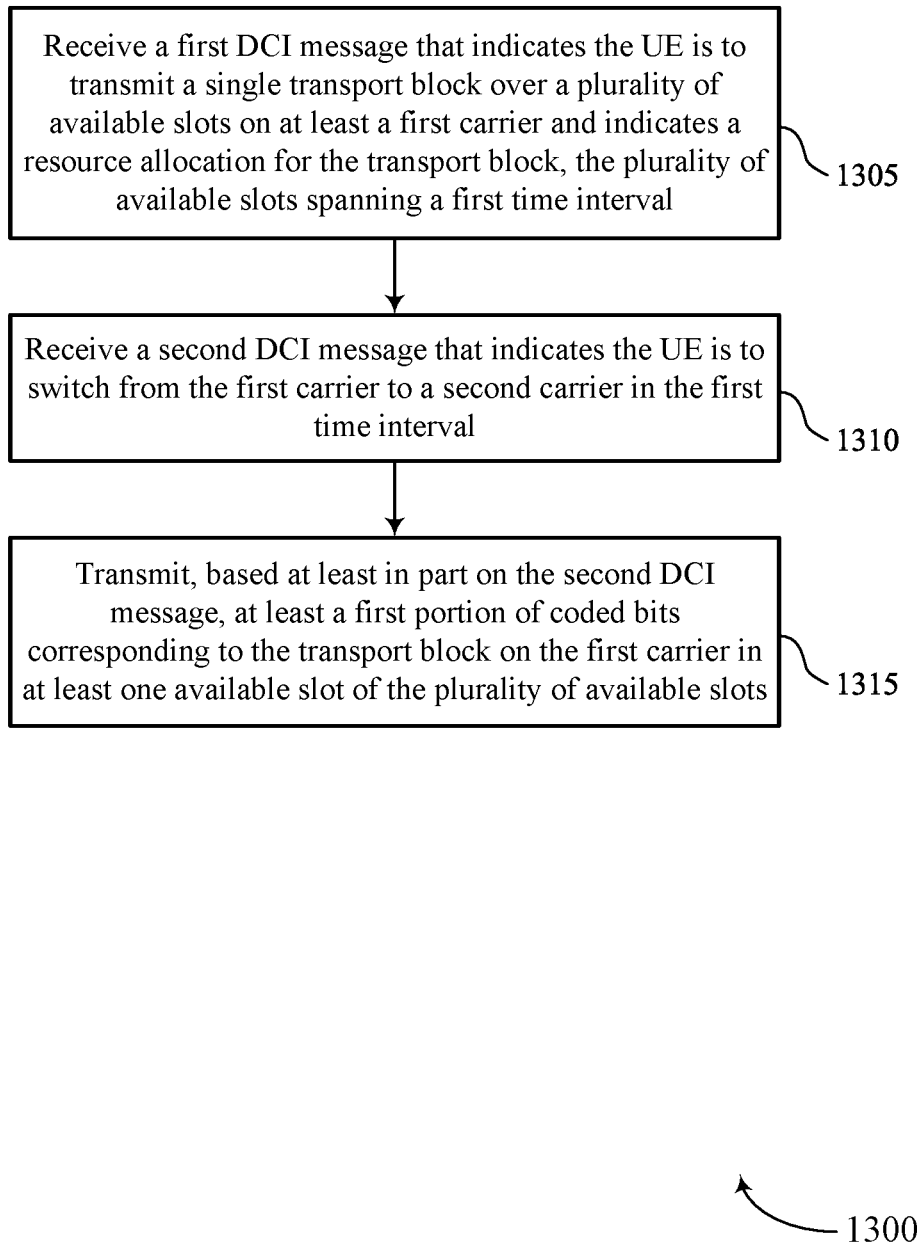
FIGS. 13 through 20 show flowcharts illustrating methods that support techniques for transport block transmission over multiple slots in accordance with aspects of the present disclosure.

FIG. 13 shows a flowchart illustrating a method 1300 that supports techniques for transport block transmission over multiple slots in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a first DCI message that indicates the UE is to transmit a single transport block over a set of multiple available slots on at least a first carrier and indicates a resource allocation for the transport block, the set of multiple available slots spanning a first time interval. The operations of 1305 may be performed in accordance with examples as disclosed herein. In some examples, aspects of the operations of 1305 may be performed by a control component 725 as described with reference to FIG. 7.

At 1310, the method may include receiving a second DCI message that indicates the UE is to switch from the first carrier to a second carrier in the first time interval. The operations of 1310 may be performed in accordance with examples as disclosed herein. In some examples, aspects of the operations of 1310 may be performed by a switch component 730 as described with reference to FIG. 7.

At 1315, the method may include transmitting, based on the second DCI message, at least a first portion of coded bits corresponding to the transport block on the first carrier in at least one available slot of the set of multiple available slots. The operations of 1315 may be performed in accordance with examples as disclosed herein. In some examples, aspects of the operations of 1315 may be performed by a transport block component 735 as described with reference to FIG. 7.

Figure 14:
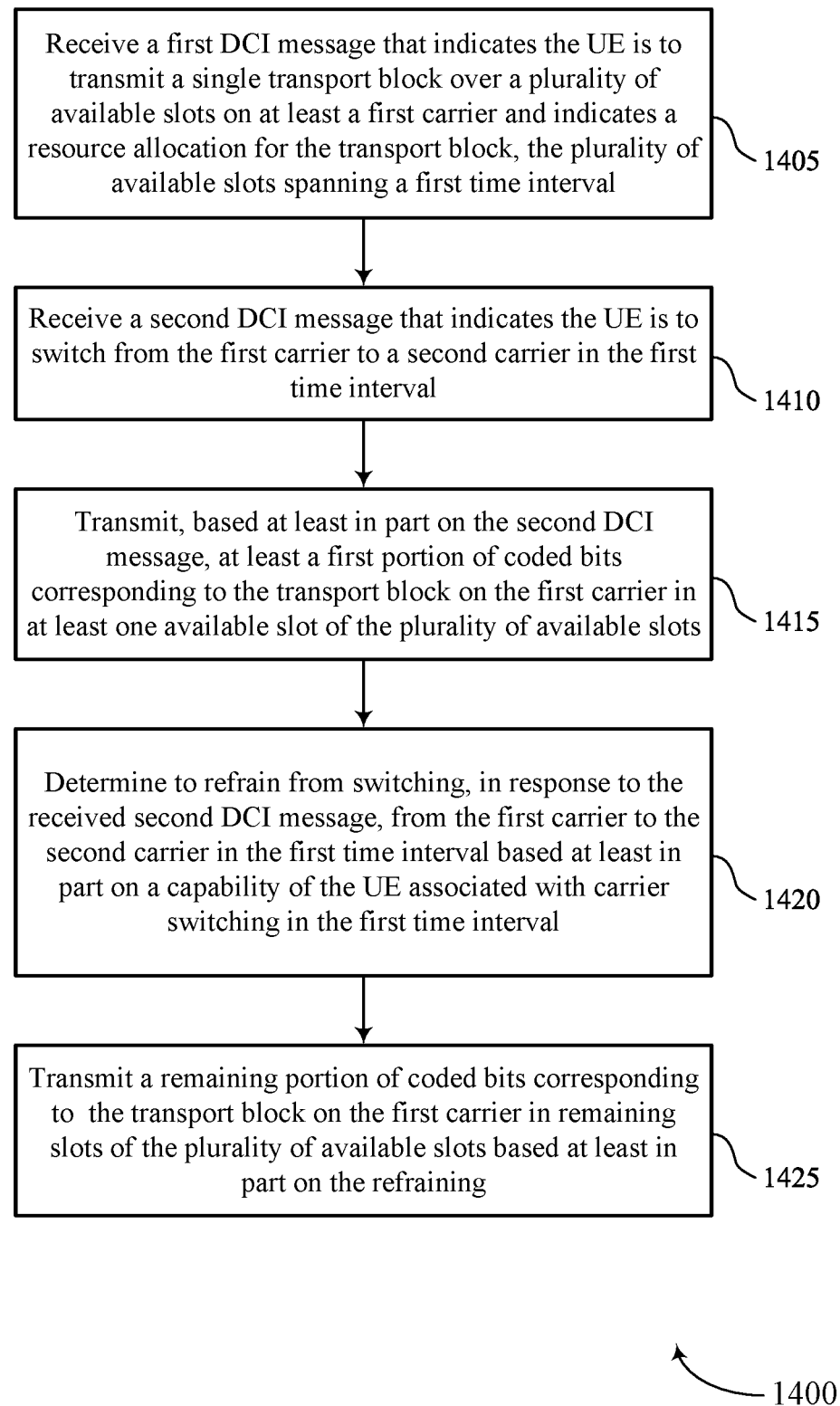

FIG. 14 shows a flowchart illustrating a method 1400 that supports techniques for transport block transmission over multiple slots in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving a first DCI message that indicates the UE is to transmit a single transport block over a set of multiple available slots on at least a first carrier and indicates a resource allocation for the transport block, the set of multiple available slots spanning a first time interval. The operations of 1405 may be performed in accordance with examples as disclosed herein. In some examples, aspects of the operations of 1405 may be performed by a control component 725 as described with reference to FIG. 7.

At 1410, the method may include receiving a second DCI message that indicates the UE is to switch from the first carrier to a second carrier in the first time interval. The operations of 1410 may be performed in accordance with examples as disclosed herein. In some examples, aspects of the operations of 1410 may be performed by a switch component 730 as described with reference to FIG. 7.

At 1415, the method may include transmitting, based on the second DCI message, at least a first portion of coded bits corresponding to the transport block on the first carrier in at least one available slot of the set of multiple available slots. The operations of 1415 may be performed in accordance with examples as disclosed herein. In some examples, aspects of the operations of 1415 may be performed by a transport block component 735 as described with reference to FIG. 7.

At 1420, the method may include determining to refrain from switching, in response to the received second DCI message, from the first carrier to the second carrier in the first time interval based on a capability of the UE associated with carrier switching in the first time interval. The operations of 1420 may be performed in accordance with examples as disclosed herein. In some examples, aspects of the operations of 1420 may be performed by a switch component 730 as described with reference to FIG. 7.

At 1425, the method may include transmitting a remaining portion of coded bits corresponding to the transport block on the first carrier in remaining slots of the set of multiple available slots based on the refraining. The operations of 1425 may be performed in accordance with examples as disclosed herein. In some examples, aspects of the operations of 1425 may be performed by a transport block component 735 as described with reference to FIG. 7.

Figure 15:
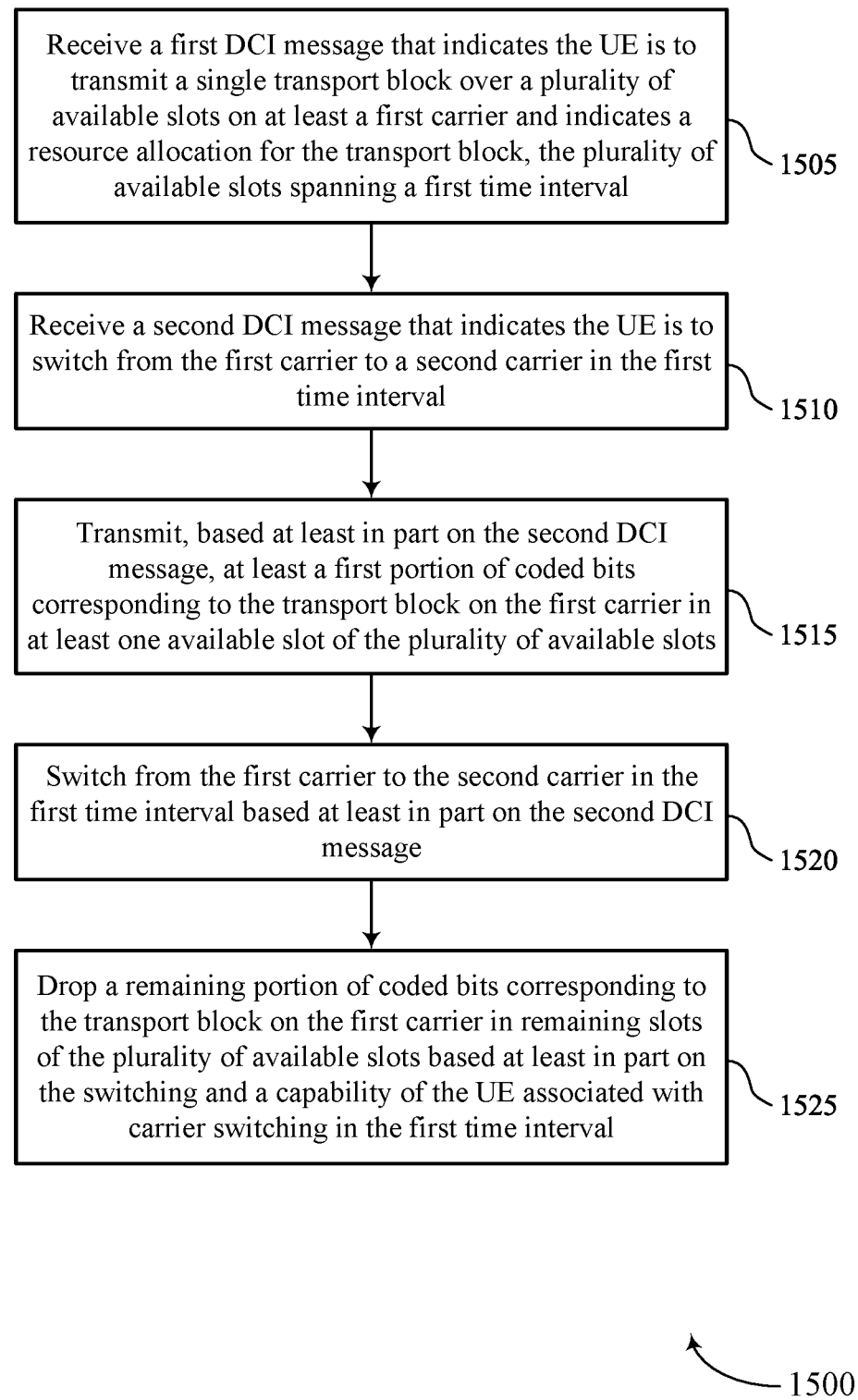

FIG. 15 shows a flowchart illustrating a method 1500 that supports techniques for transport block transmission over multiple slots in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving a first DCI message that indicates the UE is to transmit a single transport block over a set of multiple available slots on at least a first carrier and indicates a resource allocation for the transport block, the set of multiple available slots spanning a first time interval. The operations of 1505 may be performed in accordance with examples as disclosed herein. In some examples, aspects of the operations of 1505 may be performed by a control component 725 as described with reference to FIG. 7.

At 1510, the method may include receiving a second DCI message that indicates the UE is to switch from the first carrier to a second carrier in the first time interval. The operations of 1510 may be performed in accordance with examples as disclosed herein. In some examples, aspects of the operations of 1510 may be performed by a switch component 730 as described with reference to FIG. 7.

At 1515, the method may include transmitting, based on the second DCI message, at least a first portion of coded bits corresponding to the transport block on the first carrier in at least one available slot of the set of multiple available slots. The operations of 1515 may be performed in accordance with examples as disclosed herein. In some examples, aspects of the operations of 1515 may be performed by a transport block component 735 as described with reference to FIG. 7.

At 1520, the method may include switching from the first carrier to the second carrier in the first time interval based on the second DCI message. The operations of 1520 may be performed in accordance with examples as disclosed herein. In some examples, aspects of the operations of 1520 may be performed by a switch component 730 as described with reference to FIG. 7.

At 1525, the method may include dropping a remaining portion of coded bits corresponding to the transport block on the first carrier in remaining slots of the set of multiple available slots based on the switching and a capability of the UE associated with carrier switching in the first time interval. The operations of 1525 may be performed in accordance with examples as disclosed herein. In some examples, aspects of the operations of 1525 may be performed by a transport block component 735 as described with reference to FIG. 7.

Figure 16:
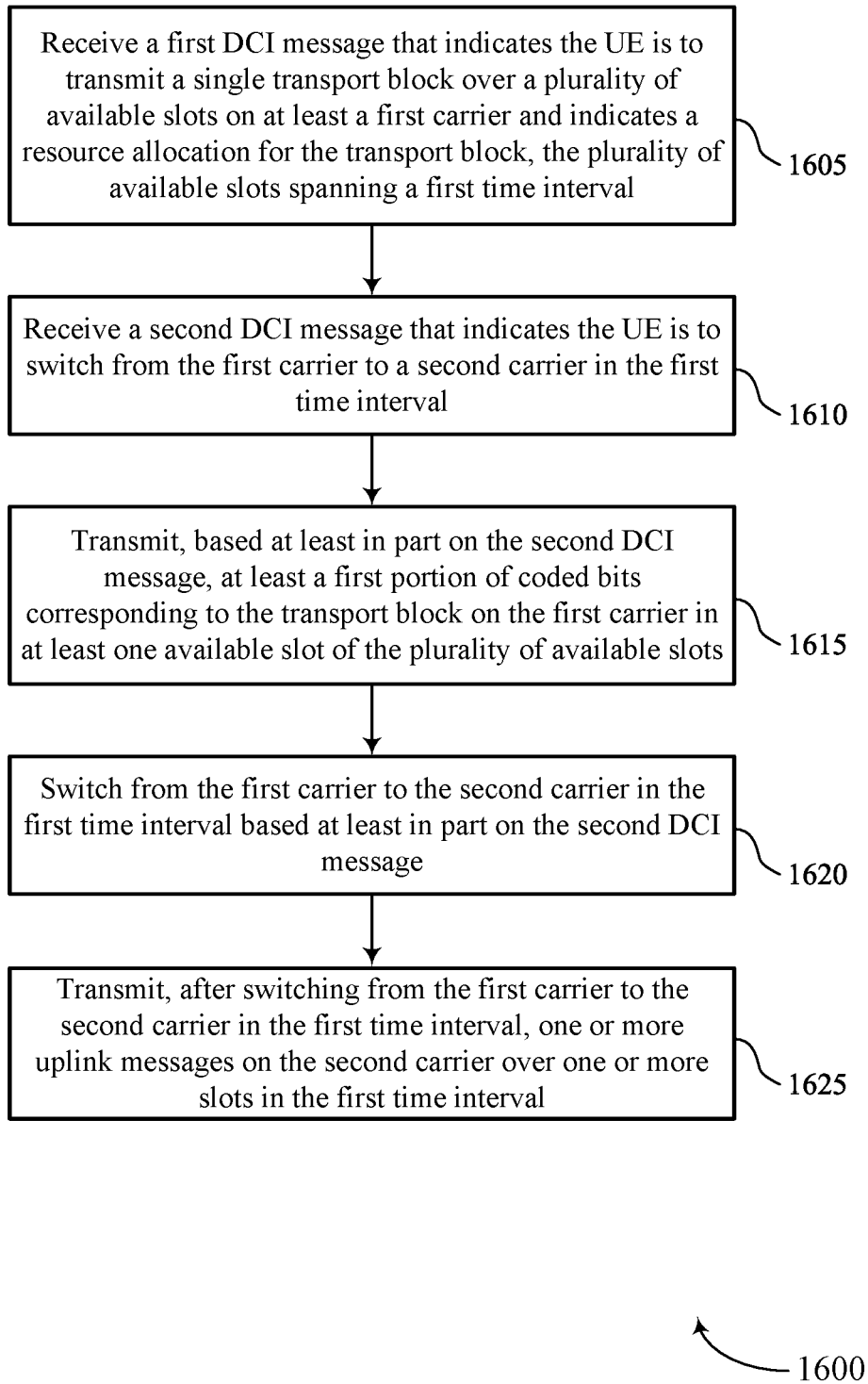

FIG. 16 shows a flowchart illustrating a method 1600 that supports techniques for transport block transmission over multiple slots in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving a first DCI message that indicates the UE is to transmit a single transport block over a set of multiple available slots on at least a first carrier and indicates a resource allocation for the transport block, the set of multiple available slots spanning a first time interval. The operations of 1605 may be performed in accordance with examples as disclosed herein. In some examples, aspects of the operations of 1605 may be performed by a control component 725 as described with reference to FIG. 7.

At 1610, the method may include receiving a second DCI message that indicates the UE is to switch from the first carrier to a second carrier in the first time interval. The operations of 1610 may be performed in accordance with examples as disclosed herein. In some examples, aspects of the operations of 1610 may be performed by a switch component 730 as described with reference to FIG. 7.

At 1615, the method may include transmitting, based on the second DCI message, at least a first portion of coded bits corresponding to the transport block on the first carrier in at least one available slot of the set of multiple available slots. The operations of 1615 may be performed in accordance with examples as disclosed herein. In some examples, aspects of the operations of 1615 may be performed by a transport block component 735 as described with reference to FIG. 7.

At 1620, the method may include switching from the first carrier to the second carrier in the first time interval based on the second DCI message. The operations of 1620 may be performed in accordance with examples as disclosed herein. In some examples, aspects of the operations of 1620 may be performed by a switch component 730 as described with reference to FIG. 7.

At 1625, the method may include transmitting, after switching from the first carrier to the second carrier in the first time interval, one or more uplink messages on the second carrier over one or more slots in the first time interval. The operations of 1625 may be performed in accordance with examples as disclosed herein. In some examples, aspects of the operations of 1625 may be performed by an interval component 740 as described with reference to FIG. 7.

Figure 17:
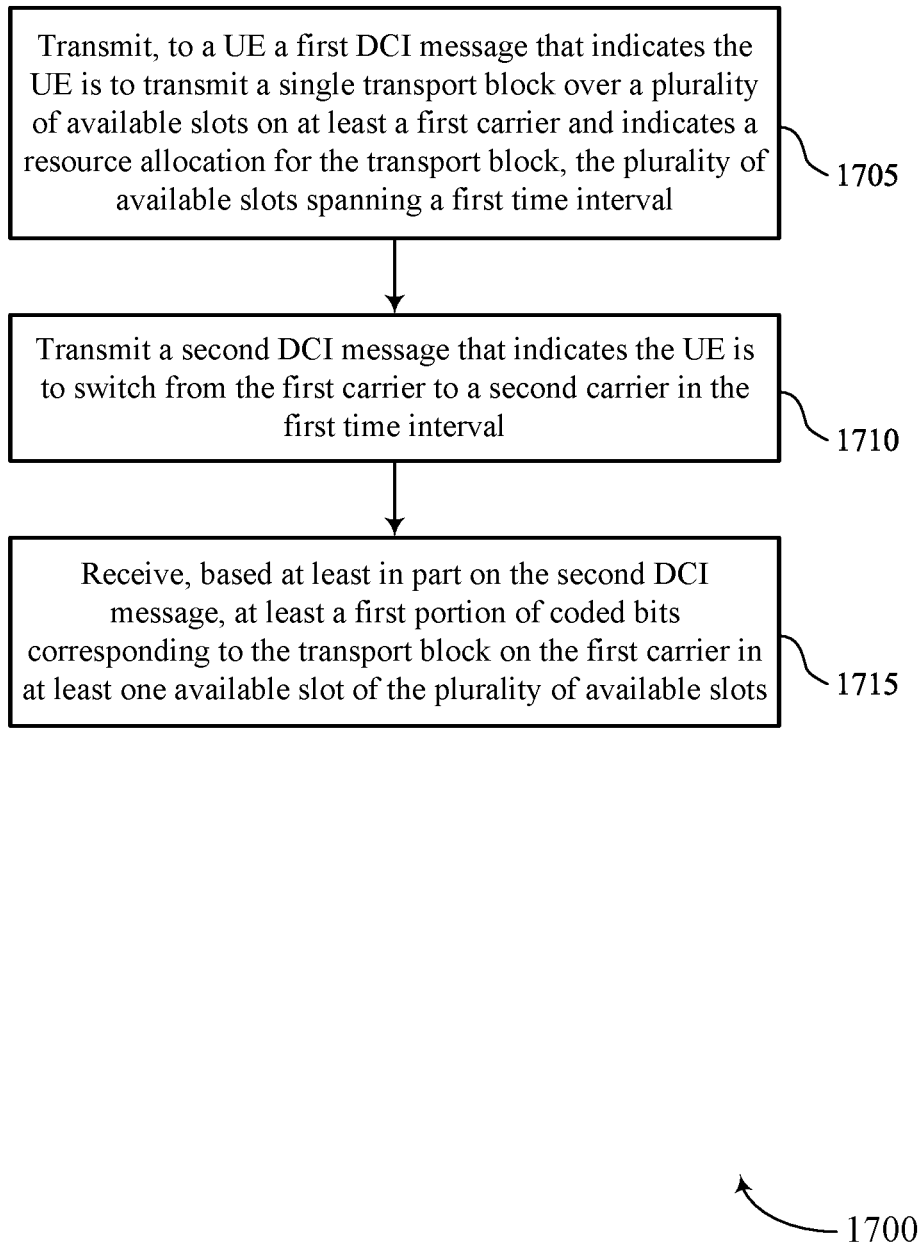

FIG. 17 shows a flowchart illustrating a method 1700 that supports techniques for transport block transmission over multiple slots in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE a first DCI message that indicates the UE is to transmit a single transport block over a set of multiple available slots on at least a first carrier and indicates a resource allocation for the transport block, the set of multiple available slots spanning a first time interval. The operations of 1705 may be performed in accordance with examples as disclosed herein. In some examples, aspects of the operations of 1705 may be performed by a control component 1125 as described with reference to FIG. 11.

At 1710, the method may include transmitting a second DCI message that indicates the UE is to switch from the first carrier to a second carrier in the first time interval. The operations of 1710 may be performed in accordance with examples as disclosed herein. In some examples, aspects of the operations of 1710 may be performed by a switch component 1130 as described with reference to FIG. 11.

At 1715, the method may include receiving, based on the second DCI message, at least a first portion of coded bits corresponding to the transport block on the first carrier in at least one available slot of the set of multiple available slots. The operations of 1715 may be performed in accordance with examples as disclosed herein. In some examples, aspects of the operations of 1715 may be performed by a transport block component 1135 as described with reference to FIG. 11.

Figure 18:
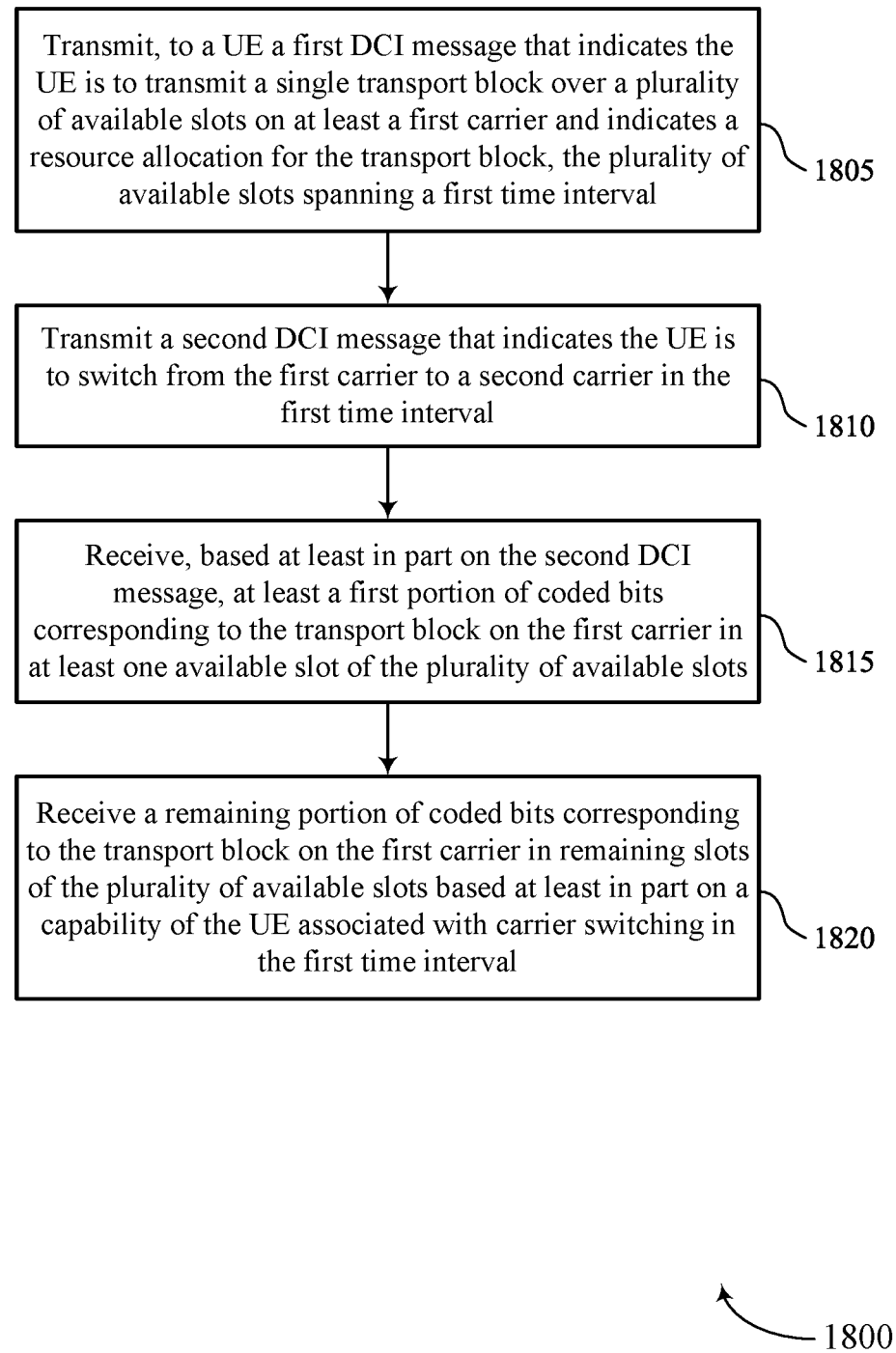

FIG. 18 shows a flowchart illustrating a method 1800 that supports techniques for transport block transmission over multiple slots in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE a first DCI message that indicates the UE is to transmit a single transport block over a set of multiple available slots on at least a first carrier and indicates a resource allocation for the transport block, the set of multiple available slots spanning a first time interval. The operations of 1805 may be performed in accordance with examples as disclosed herein. In some examples, aspects of the operations of 1805 may be performed by a control component 1125 as described with reference to FIG. 11.

At 1810, the method may include transmitting a second DCI message that indicates the UE is to switch from the first carrier to a second carrier in the first time interval. The operations of 1810 may be performed in accordance with examples as disclosed herein. In some examples, aspects of the operations of 1810 may be performed by a switch component 1130 as described with reference to FIG. 11.

At 1815, the method may include receiving, based on the second DCI message, at least a first portion of coded bits corresponding to the transport block on the first carrier in at least one available slot of the set of multiple available slots. The operations of 1815 may be performed in accordance with examples as disclosed herein. In some examples, aspects of the operations of 1815 may be performed by a transport block component 1135 as described with reference to FIG. 11.

At 1820, the method may include receiving a remaining portion of coded bits corresponding to the transport block on the first carrier in remaining slots of the set of multiple available slots based on a capability of the UE associated with carrier switching in the first time interval. The operations of 1820 may be performed in accordance with examples as disclosed herein. In some examples, aspects of the operations of 1820 may be performed by a transport block component 1135 as described with reference to FIG. 11.

Figure 19:
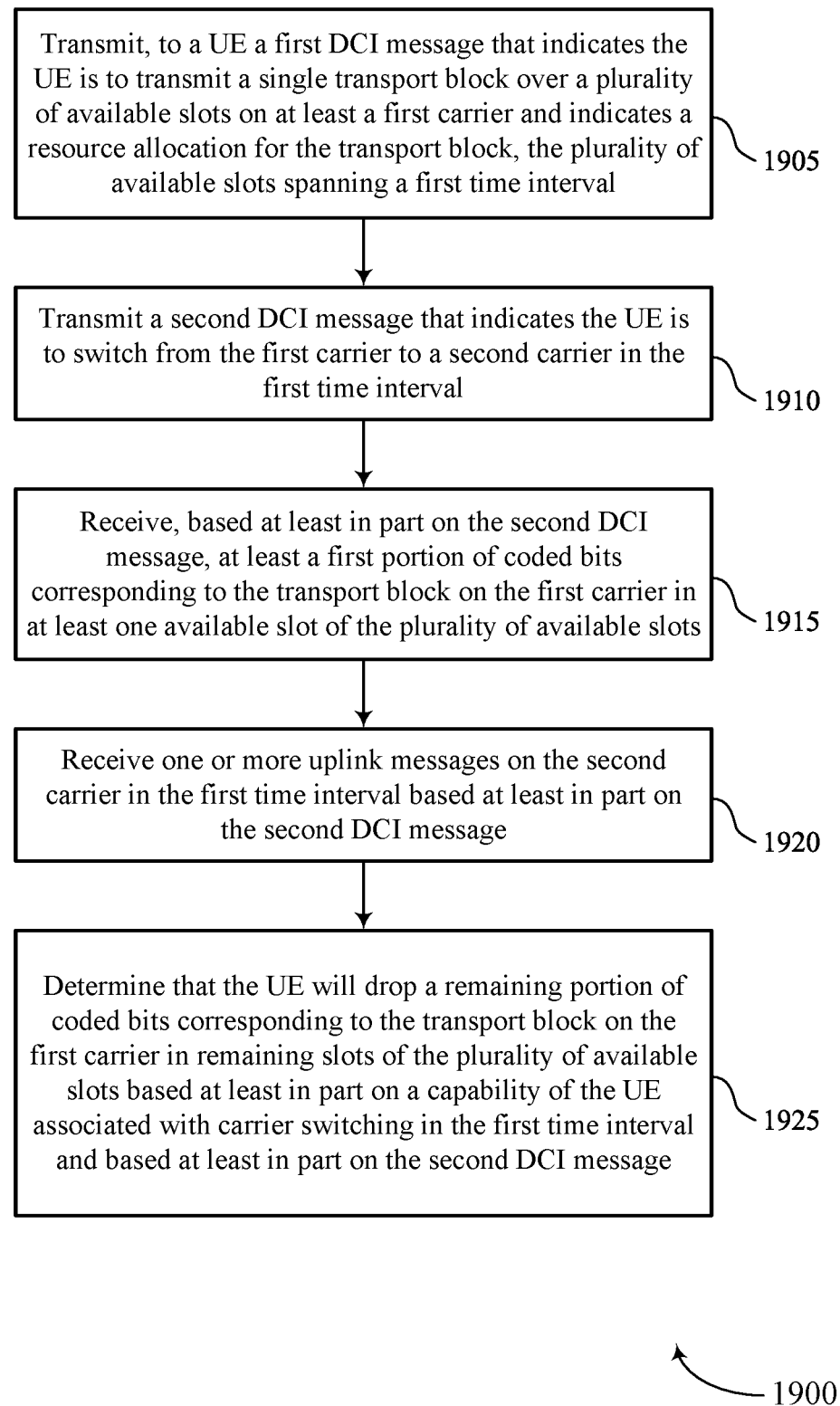

FIG. 19 shows a flowchart illustrating a method 1900 that supports techniques for transport block transmission over multiple slots in accordance with aspects of the present disclosure. The operations of the method 1900 may be implemented by a base station or its components as described herein. For example, the operations of the method 1900 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE a first DCI message that indicates the UE is to transmit a single transport block over a set of multiple available slots on at least a first carrier and indicates a resource allocation for the transport block, the set of multiple available slots spanning a first time interval. The operations of 1905 may be performed in accordance with examples as disclosed herein. In some examples, aspects of the operations of 1905 may be performed by a control component 1125 as described with reference to FIG. 11.

At 1910, the method may include transmitting a second DCI message that indicates the UE is to switch from the first carrier to a second carrier in the first time interval. The operations of 1910 may be performed in accordance with examples as disclosed herein. In some examples, aspects of the operations of 1910 may be performed by a switch component 1130 as described with reference to FIG. 11.

At 1915, the method may include receiving, based on the second DCI message, at least a first portion of coded bits corresponding to the transport block on the first carrier in at least one available slot of the set of multiple available slots. The operations of 1915 may be performed in accordance with examples as disclosed herein. In some examples, aspects of the operations of 1915 may be performed by a transport block component 1135 as described with reference to FIG. 11.

At 1920, the method may include receiving one or more uplink messages on the second carrier in the first time interval based on the second DCI message. The operations of 1920 may be performed in accordance with examples as disclosed herein. In some examples, aspects of the operations of 1920 may be performed by an uplink component 1140 as described with reference to FIG. 11.

At 1925, the method may include determining that the UE will drop a remaining portion of the transport block on the first carrier in remaining slots of the set of multiple available slots based on a capability of the UE associated with carrier switching in the first time interval and based on the second DCI message. The operations of 1925 may be performed in accordance with examples as disclosed herein. In some examples, aspects of the operations of 1925 may be performed by a capability component 1145 as described with reference to FIG. 11.

Figure 20:
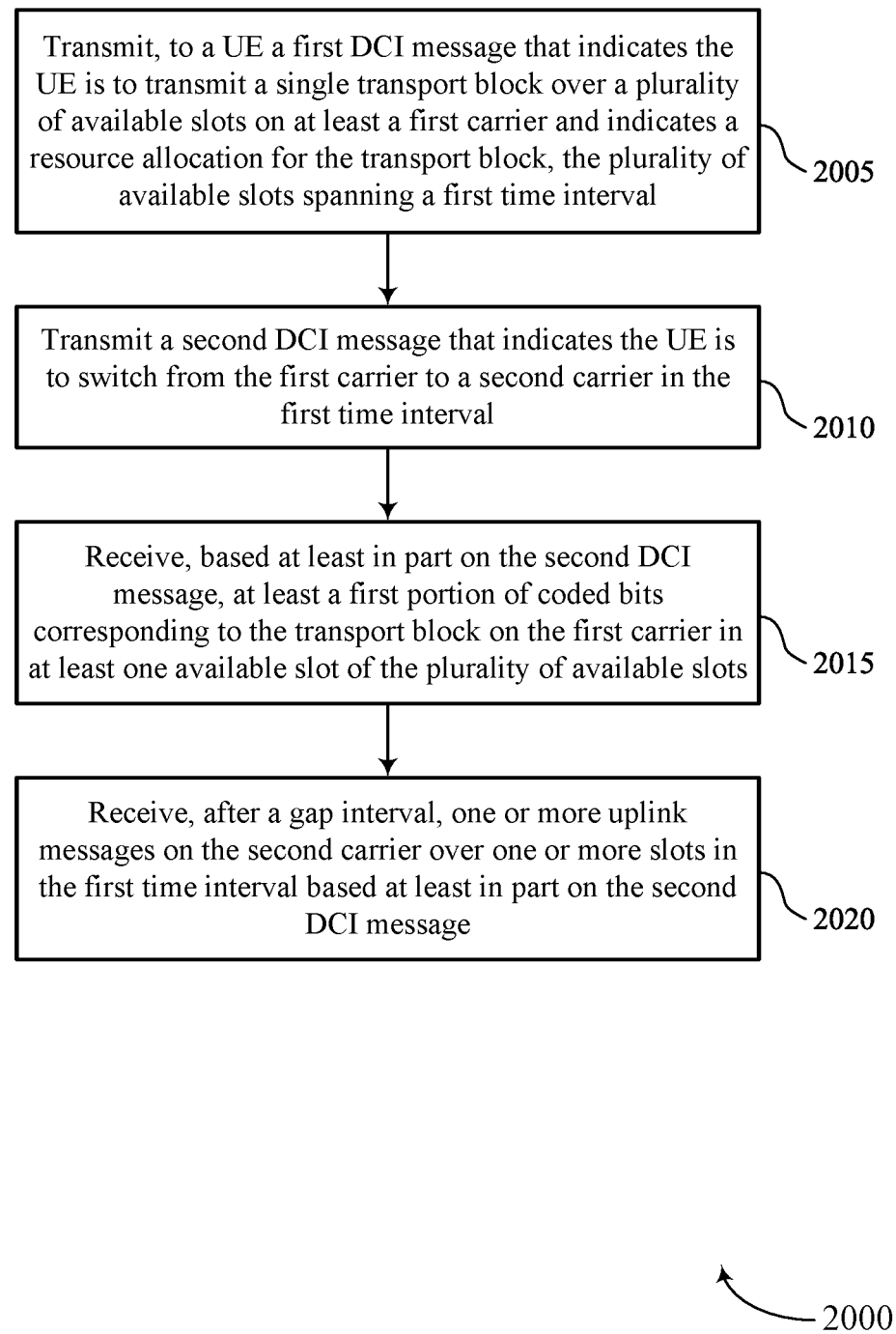

FIG. 20 shows a flowchart illustrating a method 2000 that supports techniques for transport block transmission over multiple slots in accordance with aspects of the present disclosure. The operations of the method 2000 may be implemented by a base station or its components as described herein. For example, the operations of the method 2000 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE a first DCI message that indicates the UE is to transmit a single transport block over a set of multiple available slots on at least a first carrier and indicates a resource allocation for the transport block, the set of multiple available slots spanning a first time interval. The operations of 2005 may be performed in accordance with examples as disclosed herein. In some examples, aspects of the operations of 2005 may be performed by a control component 1125 as described with reference to FIG. 11.

At 2010, the method may include transmitting a second DCI message that indicates the UE is to switch from the first carrier to a second carrier in the first time interval. The operations of 2010 may be performed in accordance with examples as disclosed herein. In some examples, aspects of the operations of 2010 may be performed by a switch component 1130 as described with reference to FIG. 11.

At 2015, the method may include receiving, based on the second DCI message, at least a first portion of coded bits corresponding to the transport block on the first carrier in at least one available slot of the set of multiple available slots. The operations of 2015 may be performed in accordance with examples as disclosed herein. In some examples, aspects of the operations of 2015 may be performed by a transport block component 1135 as described with reference to FIG. 11.

At 2020, the method may include receiving, after a gap interval, one or more uplink messages on the second carrier over one or more slots in the first time interval based on the second DCI message. The operations of 2020 may be performed in accordance with examples as disclosed herein. In some examples, aspects of the operations of 2020 may be performed by an uplink component 1140 as described with reference to FIG. 11.

The following provides an overview of aspects of the present disclosure:

Aspect 1: A method for wireless communication at a UE, comprising: receiving a first DCI message that indicates the UE is to transmit a single transport block over a plurality of available slots on at least a first carrier and indicates a resource allocation for the transport block, the plurality of available slots spanning a first time interval; receiving a second DCI message that indicates the UE is to switch from the first carrier to a second carrier in the first time interval; and transmitting, based at least in part on the second DCI message, at least a first portion of coded bits corresponding to the transport block on the first carrier in at least one available slot of the plurality of available slots.

Aspect 2: The method of aspect 1, further comprising: determining to refrain from switching, in response to the received second DCI message, from the first carrier to the second carrier in the first time interval based at least in part on a capability of the UE associated with carrier switching in the first time interval; and transmitting a remaining portion of coded bits corresponding to the transport block on the first carrier in remaining slots of the plurality of available slots based at least in part on the refraining.

Aspect 3: The method of aspect 1, further comprising: switching from the first carrier to the second carrier in the first time interval based at least in part on the second DCI message; and dropping a remaining portion of coded bits corresponding to the transport block on the first carrier in remaining slots of the plurality of available slots based at least in part on the switching and a capability of the UE associated with carrier switching in the first time interval.

Aspect 4: The method of aspect 1, further comprising: switching from the first carrier to the second carrier in the first time interval based at least in part on the second DCI message; and transmitting, after switching from the first carrier to the second carrier in the first time interval, one or more uplink messages on the second carrier over one or more slots in the first time interval.

Aspect 5: The method of aspect 4, further comprising: switching from the second carrier to the first carrier in the first time interval after transmitting the one or more uplink messages on the second carrier based at least in part on a capability of the UE associated with carrier switching in the first time interval; and transmitting, after switching from the second carrier to the first carrier in the first time interval, a second portion of coded bits corresponding to the transport block on the first carrier in one or more remaining slots of the plurality of available slots.

Aspect 6: The method of any of aspects 4 through 5, wherein transmitting the one or more uplink messages on the second carrier comprises: transmitting the one or more uplink messages on the second carrier after a gap interval.

Aspect 7: The method of aspect 6, wherein a duration of the gap interval is based at least in part on a first subcarrier spacing of the first carrier and a second subcarrier spacing of the second carrier.

Aspect 8: The method of any of aspects 6 through 7, wherein a duration of the gap interval corresponds to a fixed quantity of symbols of a slot.

Aspect 9: The method of any of aspects 6 through 8, further comprising: receiving control signaling that indicates a duration of the gap interval.

Aspect 10: The method of aspect 9, wherein the control signaling comprises at least RRC signaling, or SI, or a combination thereof.

Aspect 11: The method of any of aspects 6 through 10, further comprising: transmitting a capability message indicating a supported time interval associated with carrier switching in the first time interval, wherein the gap interval corresponds to the supported time interval.

Aspect 12: The method of any of aspects 1 through 11, further comprising: transmitting a capability message indicating that the switch from the first carrier to the second carrier in the first time interval is unsupported by the UE, wherein transmitting at least the first portion of coded bits corresponding to the transport block is based at least in part on the switch from the first carrier to the second carrier in the first time interval being unsupported by the UE.

Aspect 13: The method of any of aspects 1 through 11, further comprising: transmitting a capability message indicating that the switch from the first carrier to the second carrier in the first time interval is supported by the UE, wherein receiving the second DCI message is based at least in part on the capability message.

Aspect 14: The method of any of aspects 1 and 12, further comprising: transmitting, based at least in part on the second DCI message, a second portion of coded bits corresponding to the transport block on the second carrier in the first time interval.

Aspect 15: The method of aspect 14, wherein transmitting the second portion of coded bits corresponding to the transport block on the second carrier is based at least in part on a UE capability associated with carrier switching in the first time interval.

Aspect 16: The method of any of aspects 14 through 15, wherein transmitting the second portion of coded bits corresponding to the transport block on the second carrier comprises: transmitting the second portion of coded bits corresponding to the transport block on the second carrier after a gap interval associated with switching from the first carrier to the second carrier.

Aspect 17: The method of any of aspects 14 through 16, further comprising: transmitting a capability message indicating that the UE supports transmission of the transport block across multiple carriers, wherein transmitting the second portion of coded bits corresponding to the transport block on the second carrier in the first time interval is in accordance with the capability message.

Aspect 18: The method of any of aspects 1 through 17, further comprising: transmitting at least a second portion of coded bits corresponding to the transport block on the first carrier in at least a second available slot of the plurality of available slots based at least in part on an uplink transmission different from the transport block being scheduled in the first time interval, wherein the uplink transmission comprises an SRS transmission, a PUCCH transmission, a PUSCH transmission, a PRACH transmission, a third portion of coded bits corresponding to the transport block, or a combination thereof.

Aspect 19: The method of any of aspects 1 through 18, further comprising: transmitting, based at least in part on switching between the first carrier and the second carrier in the first time interval, a second portion of coded bits corresponding to the transport block on the first carrier in one or more remaining slots of the plurality of available slots such that a first phase associated with the first portion of coded bits corresponding to the transport block is non-continuous with a second phase associated with the second portion of coded bits corresponding to the transport block.

Aspect 20: The method of any of aspects 1 through 19, wherein the plurality of available slots comprise uplink slots, special slots, or a combination thereof.

Aspect 21: The method of any of aspects 1 through 20, wherein transmitting at least the first portion of coded bits corresponding to the transport block on the first carrier is based at least in part on a UE capability associated with carrier switching in the first time interval, the UE capability associated with a frequency band or a combination of frequency bands.

Aspect 22: The method of any of aspects 1 through 21, wherein the second DCI message is received at least a threshold period of time prior to transmitting the first portion of coded bits corresponding to the transport block.

Aspect 23: The method of any of aspects 1 through 22, wherein the first carrier is an NUL carrier and the second carrier is an SUL carrier.

Aspect 24: A method for wireless communication at a base station, comprising: transmitting, to a UE a first DCI message that indicates the UE is to transmit a single transport block over a plurality of available slots on at least a first carrier and indicates a resource allocation for the transport block, the plurality of available slots spanning a first time interval; transmitting a second DCI message that indicates the UE is to switch from the first carrier to a second carrier in the first time interval; and receiving, based at least in part on the second DCI message, at least a first portion of coded bits corresponding to the transport block on the first carrier in at least one available slot of the plurality of available slots.

Aspect 25: The method of aspect 24, further comprising: receiving a remaining portion of coded bits corresponding to the transport block on the first carrier in remaining slots of the plurality of available slots based at least in part on a capability of the UE associated with carrier switching in the first time interval.

Aspect 26: The method of aspect 24, further comprising: receiving one or more uplink messages on the second carrier in the first time interval based at least in part on the second DCI message; and determining that the UE will drop a remaining portion of coded bits corresponding to the transport block on the first carrier in remaining slots of the plurality of available slots based at least in part on a capability of the UE associated with carrier switching in the first time interval and based at least in part on the second DCI message.

Aspect 27: The method of aspect 24, further comprising: receiving, after a gap interval, one or more uplink messages on the second carrier over one or more slots in the first time interval based at least in part on the second DCI message.

Aspect 28: The method of aspect 27, further comprising: receiving, after a second gap interval, a second portion of coded bits corresponding to the transport block on the first carrier in one or more remaining slots of the plurality of available slots based least in part on a capability of the UE associated with carrier switching in the first time interval.

Aspect 29: The method of aspect 24, further comprising: receiving, based at least in part on the second DCI message, a second portion of coded bits corresponding to the transport block on the second carrier in the first time interval.

Aspect 30: The method of any of aspects 24 through 29, further comprising: receiving a capability message indicating that the switch from the first carrier to the second carrier in the first time interval is unsupported by the UE, wherein receiving at least the first portion of coded bits corresponding to the transport block is based at least in part on the switch from the first carrier to the second carrier in the first time interval being unsupported by the UE.

Aspect 31: The method of any of aspects 24 through 30, further comprising: receiving a capability message indicating that the switch from the first carrier to the second carrier in the first time interval is supported by the UE, wherein transmitting the second DCI message is based at least in part on the capability message.

Aspect 32: An apparatus for wireless communication at a UE, comprising a processor; memory coupled with the processor; and instructions stored in the memory and executable by the processor to cause the apparatus to perform a method of any of aspects 1 through 23.

Aspect 33: An apparatus for wireless communication at a UE, comprising at least one means for performing a method of any of aspects 1 through 23.

Aspect 34: A non-transitory computer-readable medium storing code for wireless communication at a UE, the code comprising instructions executable by a processor to perform a method of any of aspects 1 through 23.

Aspect 35: An apparatus for wireless communication at a base station, comprising a processor; memory coupled with the processor; and instructions stored in the memory and executable by the processor to cause the apparatus to perform a method of any of aspects 24 through 31.

Aspect 36: An apparatus for wireless communication at a base station, comprising at least one means for performing a method of any of aspects 24 through 31.

Aspect 37: A non-transitory computer-readable medium storing code for wireless communication at a base station, the code comprising instructions executable by a processor to perform a method of any of aspects 24 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a first downlink control information message that indicates the UE is to transmit a single transport block over a plurality of available slots on at least a first carrier and indicates a resource allocation for the transport block, the plurality of available slots spanning a first time interval;
   receiving a second downlink control information message that indicates the UE is to switch from the first carrier to a second carrier in the first time interval; and
   transmitting, based at least in part on the second downlink control information message, at least a first portion of coded bits corresponding to the transport block on the first carrier in at least one available slot of the plurality of available slots.

2. The method of claim 1, further comprising:
   determining to refrain from switching, in response to the received second downlink control information message, from the first carrier to the second carrier in the first time interval based at least in part on a capability of the UE associated with carrier switching in the first time interval; and
   transmitting a remaining portion of coded bits corresponding to the transport block on the first carrier in remaining slots of the plurality of available slots based at least in part on the refraining.

3. The method of claim 1, further comprising:
   switching from the first carrier to the second carrier in the first time interval based at least in part on the second downlink control information message; and
   dropping a remaining portion of coded bits corresponding to the transport block on the first carrier in remaining slots of the plurality of available slots based at least in part on the switching and a capability of the UE associated with carrier switching in the first time interval.

4. The method of claim 1, further comprising:
   switching from the first carrier to the second carrier in the first time interval based at least in part on the second downlink control information message; and
   transmitting, after switching from the first carrier to the second carrier in the first time interval, one or more uplink messages on the second carrier over one or more slots in the first time interval.

5. The method of claim 4, further comprising:
   switching from the second carrier to the first carrier in the first time interval after transmitting the one or more uplink messages on the second carrier based at least in part on a capability of the UE associated with carrier switching in the first time interval; and
   transmitting, after switching from the second carrier to the first carrier in the first time interval, a second portion of coded bits corresponding to the transport block on the first carrier in one or more remaining slots of the plurality of available slots.

6. The method of claim 4, wherein transmitting the one or more uplink messages on the second carrier comprises:
   transmitting the one or more uplink messages on the second carrier after a gap interval.

7. The method of claim 6, wherein a duration of the gap interval is based at least in part on a first subcarrier spacing of the first carrier and a second subcarrier spacing of the second carrier.

8. The method of claim 6, wherein a duration of the gap interval corresponds to a fixed quantity of symbols of a slot.

9. The method of claim 6, further comprising:
   receiving control signaling that indicates a duration of the gap interval.

10. The method of claim 9, wherein the control signaling comprises at least radio resource control signaling, or system information, or a combination thereof.

11. The method of claim 6, further comprising:
transmitting a capability message indicating a supported time interval associated with carrier switching in the first time interval, wherein the gap interval corresponds to the supported time interval.

12. The method of claim 1, further comprising:
transmitting a capability message indicating that the switch from the first carrier to the second carrier in the first time interval is unsupported by the UE, wherein transmitting at least the first portion of coded bits corresponding to the transport block is based at least in part on the switch from the first carrier to the second carrier in the first time interval being unsupported by the UE.

13. The method of claim 1, further comprising:
transmitting a capability message indicating that the switch from the first carrier to the second carrier in the first time interval is supported by the UE, wherein receiving the second downlink control information message is based at least in part on the capability message.

14. The method of claim 1, further comprising:
transmitting, based at least in part on the second downlink control information message, a second portion of coded bits corresponding to the transport block on the second carrier in the first time interval.

15. The method of claim 14, wherein transmitting the second portion of coded bits corresponding to the transport block on the second carrier is based at least in part on a UE capability associated with carrier switching in the first time interval.

16. The method of claim 14, wherein transmitting the second portion of coded bits corresponding to the transport block on the second carrier comprises:
transmitting the second portion of coded bits corresponding to the transport block on the second carrier after a gap interval associated with switching from the first carrier to the second carrier.

17. The method of claim 14, further comprising:
transmitting a capability message indicating that the UE supports transmission of the transport block across multiple carriers, wherein transmitting the second portion of coded bits corresponding to the transport block on the second carrier in the first time interval is in accordance with the capability message.

18. The method of claim 1, further comprising:
transmitting at least a second portion of coded bits corresponding to the transport block on the first carrier in at least a second available slot of the plurality of available slots based at least in part on an uplink transmission different from the transport block being scheduled in the first time interval, wherein the uplink transmission comprises a sounding reference signal transmission, a physical uplink control channel transmission, a physical uplink shared channel transmission, a physical random access channel transmission, a third portion of coded bits corresponding to the transport block, or a combination thereof.

19. The method of claim 1, further comprising:
transmitting, based at least in part on switching between the first carrier and the second carrier in the first time interval, a second portion of coded bits corresponding to the transport block on the first carrier in one or more remaining slots of the plurality of available slots such that a first phase associated with the first portion of coded bits corresponding to the transport block is non-continuous with a second phase associated with the second portion of coded bits corresponding to the transport block.

20. The method of claim 1, wherein the plurality of available slots comprise uplink slots, special slots, or a combination thereof.

21. The method of claim 1, wherein transmitting at least the first portion of coded bits corresponding to the transport block on the first carrier is based at least in part on a UE capability associated with carrier switching in the first time interval, the UE capability associated with a frequency band or a combination of frequency bands.

22. The method of claim 1, wherein the second downlink control information message is received at least a threshold period of time prior to transmitting the first portion of coded bits corresponding to the transport block.

23. The method of claim 1, wherein the first carrier is a normal uplink carrier and the second carrier is a supplemental uplink carrier.

24. A method for wireless communication at a base station, comprising:
transmitting, to a user equipment (UE) a first downlink control information message that indicates the UE is to transmit a single transport block over a plurality of available slots on at least a first carrier and indicates a resource allocation for the transport block, the plurality of available slots spanning a first time interval;
transmitting a second downlink control information message that indicates the UE is to switch from the first carrier to a second carrier in the first time interval; and
receiving, based at least in part on the second downlink control information message, at least a first portion of coded bits corresponding to the transport block on the first carrier in at least one available slot of the plurality of available slots.

25. The method of claim 24, further comprising:
receiving a remaining portion of coded bits corresponding to the transport block on the first carrier in remaining slots of the plurality of available slots based at least in part on a capability of the UE associated with carrier switching in the first time interval.

26. The method of claim 24, further comprising:
receiving one or more uplink messages on the second carrier in the first time interval based at least in part on the second downlink control information message; and
determining that the UE will drop a remaining portion of coded bits corresponding to the transport block on the first carrier in remaining slots of the plurality of available slots based at least in part on a capability of the UE associated with carrier switching in the first time interval and based at least in part on the second downlink control information message.

27. The method of claim 24, further comprising:
receiving, after a gap interval, one or more uplink messages on the second carrier over one or more slots in the first time interval based at least in part on the second downlink control information message.

28. The method of claim 24, further comprising:
receiving, based at least in part on the second downlink control information message, a second portion of coded bits corresponding to the transport block on the second carrier in the first time interval.

29. An apparatus for wireless communication at a user equipment (UE), comprising:
a processor;
memory coupled with the processor; and instructions stored in the memory and executable by the processor to cause the apparatus to:

receive a first downlink control information message that indicates the UE is to transmit a single transport block over a plurality of available slots on at least a first carrier and indicates a resource allocation for the transport block, the plurality of available slots spanning a first time interval;

receive a second downlink control information message that indicates the UE is to switch from the first carrier to a second carrier in the first time interval; and transmit, based at least in part on the second downlink control information message, at least a first portion of coded bits corresponding to the transport block on the first carrier in at least one available slot of the plurality of available slots.

30. An apparatus for wireless communication at a base station, comprising:
a processor;
memory coupled with the processor; and
instructions stored in the memory and executable by the processor to cause the apparatus to:

transmit, to a user equipment (UE) a first downlink control information message that indicates the UE is to transmit a single transport block over a plurality of available slots on at least a first carrier and indicates a resource allocation for the transport block, the plurality of available slots spanning a first time interval;

transmit a second downlink control information message that indicates the UE is to switch from the first carrier to a second carrier in the first time interval; and receive, based at least in part on the second downlink control information message, at least a first portion of coded bits corresponding to the transport block on the first carrier in at least one available slot of the plurality of available slots.

\* \* \* \* \*